(12) United States Patent
Lei et al.

(10) Patent No.:  US 12,592,433 B2
(45) Date of Patent:       Mar. 31, 2026

(54) BATTERY CELL, BATTERY, AND ELECTRICAL EQUIPMENT

(71) Applicant: CONTEMPORARY AMPEREX TECHNOLOGY (HONG KONG) LIMITED, Hong Kong (CN)

(72) Inventors: Yuyong Lei, Ningde (CN); Zhijun Guo, Ningde (CN); Chuan Li, Ningde (CN); Han Yan, Ningde (CN); Shaobin Huang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/190,579

(22) Filed: Apr. 25, 2025

(65) Prior Publication Data

US 2025/0253448 A1      Aug. 7, 2025

Related U.S. Application Data

(63) Continuation of application No. PCT/CN2023/078796, filed on Feb. 28, 2023.

(51) Int. Cl.
*H01M 50/103*       (2021.01)
*H01M 50/342*       (2021.01)
*H01M 50/593*       (2021.01)

(52) U.S. Cl.
CPC ..... *H01M 50/103* (2021.01); *H01M 50/3425* (2021.01); *H01M 50/593* (2021.01); *H01M 2220/20* (2013.01)

(58) Field of Classification Search
CPC ........... H01M 50/103; H01M 50/3425; H01M 50/593; H01M 2220/20
See application file for complete search history.

(56) References Cited

U.S. PATENT DOCUMENTS

2005/0112415 A1      5/2005   Takeshita et al.
2011/0014506 A1      1/2011   Hermann et al.
(Continued)

FOREIGN PATENT DOCUMENTS

CN            1641903  A      7/2005
CN          203071141  U      7/2013
(Continued)

OTHER PUBLICATIONS

International Search Report and Written Opinion mailed on Jun. 23, 2023, received for PCT Application PCT/CN2023/078796, filed on Feb. 28, 2023, 13 pages including English Translation.
(Continued)

*Primary Examiner* — Brian R Ohara
*Assistant Examiner* — Brent C Thomas
(74) *Attorney, Agent, or Firm* — XSENSUS LLP

(57)                    ABSTRACT

Provided are a battery cell, battery, and an electrical equipment. The battery cell includes a housing and a first insulating member. The housing provides a welding mark region. The first insulating member is arranged on an outer surface of the housing, and the first insulating member provides a first thickened region, wherein the first thickened region covers at least a portion of the welding mark region. This reduces the risk of the welding mark region piercing through the first insulating member, which could cause insulation failure of the battery cell. Thus, the insulation performance of the battery cell is improved.

19 Claims, 15 Drawing Sheets

(56)           References Cited

U.S. PATENT DOCUMENTS

| | | |
|---|---|---|
| 2014/0212717 A1 | 7/2014 | Ariga et al. |
| 2017/0250388 A1* | 8/2017 | Unno ................... H01M 50/141 |
| 2020/0251692 A1* | 8/2020 | Oh ......................... H01M 50/10 |
| 2021/0194043 A1 | 6/2021 | Kifune |
| 2022/0109212 A1 | 4/2022 | Bai |
| 2022/0123406 A1 | 4/2022 | Yu et al. |
| 2022/0336913 A1 | 10/2022 | Gu et al. |
| 2023/0216134 A1* | 7/2023 | Lee ........................ H01M 50/46 |
| | | 429/53 |

FOREIGN PATENT DOCUMENTS

| | | |
|---|---|---|
| CN | 211045480 U | 7/2020 |
| CN | 211980650 U | 11/2020 |
| CN | 213520128 U | 6/2021 |
| CN | 113097659 A | 7/2021 |
| CN | 215070146 U | 12/2021 |
| CN | 216213918 U | 4/2022 |
| CN | 217035922 U | 7/2022 |
| CN | 218123636 U | 12/2022 |
| CN | 218351658 U | 1/2023 |
| CN | 218414822 U | 1/2023 |
| EP | 3690975 A1 | 8/2020 |
| EP | 3993144 A2 | 5/2022 |
| JP | 2007-087922 A | 4/2007 |
| JP | 2012-009317 A | 1/2012 |
| JP | 2018-028964 A | 2/2018 |

OTHER PUBLICATIONS

International Search Report and Written Opinion mailed on Nov. 15, 2023, received for PCT Application PCT/CN2023/089821, filed on Apr. 21, 2023, 13 pages including English Translation.

Notice of Grant of Utility Model Patent mailed on Jul. 6, 2023, received for JP Application 202320345615.2, 2 pages including English Translation.

Notice of Grant of Utility Model Patent mailed on Jan. 17, 2024, received for JP Application 202390000064.4, 2 pages including English Translation.

Extended European Search Report issued Oct. 29, 2025 in European Patent Application No. 23924595.4.

Extended European Search Report issued Nov. 12, 2025 in European Patent Application No. 23924781.0.

Office Action issued May 9, 2025 in U.S. Appl. No. 19/053,159.

* cited by examiner

1000

100

11

112 (1121)

11211          11212

113          113

111

112 (1122)          112 (1122)

X
Y

113

113

112 (1121)

11211          11212

11213          L₃          L₄          11214

BATTERY CELL, BATTERY, AND ELECTRICAL EQUIPMENT

CROSS-REFERENCE TO RELATED APPLICATION

The present disclosure is a continuation of PCT international application No. PCT/CN2023/078796, filed on Feb. 28, 2023, the contents of which are incorporated herein by reference in its entirety.

TECHNICAL FIELD

The present disclosure relates to the technical field of batteries, and specifically, to a battery cell, a battery, and electrical equipment.

BACKGROUND ART

With the development of new energy technologies, the application of batteries is becoming increasingly widespread. For example, they are used in mobile phones, laptops, electric bicycles, electric cars, electric airplanes, electric ships, electric toy cars, electric toy ships, electric toy airplanes, and electric tools.

In battery technology, the battery cell needs to provide good insulation performance to reduce the risk of short circuits in the battery cell, which could result in risks such as battery cell on fire or explosion. Therefore, how to improve the insulation performance of battery cells is an urgent issue to be addressed in battery technology.

SUMMARY

The embodiments of the present disclosure provide a battery cell, a battery, and electrical equipment that effectively enhance the insulation performance of battery cell.

In a first aspect, the present disclosure provides an embodiment of a battery cell, including a housing and a first insulating member. The housing provides a welding mark region. The first insulating member is arranged on an outer surface of the housing, and the first insulating member provides a first thickened region, wherein the first thickened region covers at least a portion of the welding mark region.

In the above technical solution, the first thickened region of the first insulating member covers at least a portion of the welding mark region. This reduces the risk of the welding mark region piercing through the first insulating member, which could cause insulation failure of the battery cell. Thus, the insulation performance of the battery cell is improved.

In some embodiments, the first insulating member includes a first insulating portion and a second insulating portion, wherein the first insulating portion and the second insulating portion are arranged on the outer surface of the housing. The first insulating portion and the second insulating portion provide a first overlapping region, wherein the first overlapping region forms the first thickened region. Through the overlapping of the first insulating portion and the second insulating portion to form the first overlapping region, local thickening of the first insulating member is achieved, thereby correspondingly forming the first thickened region, with a simple formation method for the first thickened region.

In some embodiments, the first insulating member is covered on the outer surface of the housing in a circumferential direction of the housing, and in the circumferential direction of the housing, two end portions of the first insulating member respectively form the first insulating portion and the second insulating portion. By covering the first insulating member on the outer surface of the housing in a circumferential direction of the housing, more regions of the outer surface of the housing can be rapidly covered, thereby improving the insulation performance of the battery cell. When the first insulating member is covered on the outer surface of the housing in the circumferential direction of the housing and the two end portions of the first insulating member overlap, the first thickened region can be formed, with a simple method for forming the first thickened region. When the first insulating member is covered on the outer surface of the housing, the position of the welding mark region can be more conveniently confirmed, enabling the first thickened region to quickly cover the welding mark region, thereby improving production efficiency.

In some embodiments, the housing includes a first wall portion, and the welding mark region is located on the first wall portion. The first insulating portion and the second insulating portion jointly cover the outer surface of the first wall portion. The first insulating portion and the second insulating portion jointly cover the outer surface of the first wall portion where the welding mark region is formed, thereby achieving insulation of the first wall portion and improving the insulation performance of the battery cell.

In some embodiments, the first thickened region completely covers the welding mark region. Increasing the overlap region between the first thickened region and the welding mark region further reduces the risk of the welding mark region piercing through the first insulating member.

In some embodiments, in the circumferential direction of the housing, a width of the first thickened region is $W_1$, and a width of the welding mark region is $W_2$, wherein $W_1 > W_2$. In this way, the first thickened region has more region available to cover the welding mark region.

In some embodiments, $W_1 - W_2 \geq 1$ mm. In this way, the first thickened region has a larger coverage margin, which facilitates the complete coverage of the welding mark region by the first thickened region, meets the alignment accuracy requirements between the first thickened region and the welding mark region, and improves the assembly efficiency of the first insulating member with the housing.

In some embodiments, $W_1 \geq 3$ mm. In this way, the first thickened region has a larger width, enabling it to cover more regions of the welding mark region.

In some embodiments, the welding mark region includes a first protruding portion that protrudes from the outer surface of the housing, wherein a height of the first protruding portion protruding from the outer surface of the housing is $H_1$, and a thickness of the first thickened region is $D_1$, wherein $H_1 < D_1$. In this way, even if the first protruding portion fully penetrates the first thickened region, it is unlikely to pierce through the first thickened region, thus further reducing the risk of insulation failure in the battery cell.

In some embodiments, the housing is formed by bending a sheet, and in the circumferential direction of the housing, the sheet includes a first end portion and a second end portion, wherein the first end portion and the second end portion are welded together to form the welding mark region. The method of forming the housing is simple, which can effectively reduce the forming difficulty of the housing. Furthermore, when forming the housing, it is only necessary to weld the first end portion and the second end portion of the sheet and form the welding mark region in the welding region of the first end portion and the second end portion. Therefore, the housing has good strength.

In some embodiments, an end surface of the first end portion is welded to an end surface of the second end portion. On one hand, no overlapping part is provided between the two end portions of the sheet after connection, which conserves material and reduces the production cost of the housing. On the other hand, this makes the housing flatter, increases the internal space of the housing, and contributes to the improvement of the energy density of the battery cell.

In some embodiments, the first end portion and the second end portion have a second overlapping region, and the welding mark region is located in the second overlapping region. In this way, the welding difficulty of the first end portion and second end portion is reduced, and the contact area between the first end portion and second end portion is increased, thereby improving the connection strength of the first end portion and second end portion.

In some embodiments, the housing includes multiple wall portions and multiple corner portions, and in the circumferential direction of the housing, each corner portion connects two adjacent wall portions. The welding mark region is located on a wall portion. This reduces the positioning difficulty of the housing during the welding and forming process, thereby reducing the forming difficulty of the housing. Additionally, by arranging the welding mark region on a wall portion instead of a corner portion, the connection strength of the housing at the welding position is improved, thereby enhancing the strength of the housing.

In some embodiments, the multiple wall portions include a first wall portion and a second wall portion. The first wall portion and the second wall portion are connected by a corner portion, wherein the second wall portion is the wall portion with the largest outer surface area in the housing. The welding mark region is located on the first wall portion. Since the second wall portion is the wall portion with the largest outer surface area in the housing, the second wall portion is more prone to deformation compared to the first wall portion when the electrode assembly inside the battery cell expands. By arranging the welding mark region on the first wall portion, which has a smaller deformation, on the one hand, the arrangement can reduce the risk of the housing damage in the welding mark region when the electrode assembly expands; and on the other hand, it reduces the risk of the welding mark region piercing through the first insulating member when the electrode assembly expands.

In some embodiments, the multiple wall portions include two first wall portions and two second wall portions, with the two first wall portions arranged opposite each other along a first direction and the two second wall portions arranged opposite each other along a second direction, wherein the first direction is perpendicular to the second direction. At least one of the first wall portions forms the welding mark region. The housing is in the form of a quadrilateral prism structure, which is simple in structure.

In some embodiments, the battery cell further includes a pressure relief mechanism, with the pressure relief mechanism and the welding mark region located on separate wall portions. By not arranging the pressure relief mechanism and the welding mark region on the same wall portion, the impact on the pressure relief mechanism, when the housing is welded to form the welding mark region, is reduced, thereby improving the reliability of the pressure relief mechanism.

In some embodiments, the multiple wall portions include two opposing first wall portions, with the pressure relief mechanism and the welding mark region respectively located on the two first wall portions. Thus, the distance between the pressure relief mechanism and the welding mark region in the circumferential direction of the housing is increased, further reducing the impact on the pressure relief mechanism when the housing is welded to form the welding mark region.

In some embodiments, the battery cell further includes an electrode assembly and a second insulating member. The electrode assembly is arranged inside the housing. The second insulating member is arranged between the electrode assembly and the housing, and the second insulating member is configured to insulate and isolate the electrode assembly from the housing. The second insulating member includes a second thickened region, and the second thickened region covers at least a portion of the welding mark region. The second insulating member is located between the electrode assembly and the housing, serving to separate the electrode assembly from the housing and thereby providing insulation between the electrode assembly and the housing. The second thickened region of the second insulating member covers at least a portion of the welding mark region, which reduces the risk of failure of the insulation between the electrode assembly and the housing due to penetration of the second insulating member by the welding mark region.

In some embodiments, the second insulating member includes a third insulating portion and a fourth insulating portion, wherein the third insulating portion and fourth insulating portion have a third overlapping region, and the third overlapping region forms the second thickened region. Through the overlapping of the third insulating portion and the fourth insulating portion to form the third overlapping region, local thickening of the second insulating member is achieved, thereby correspondingly forming the second thickened region, with a simple formation method for the second thickened region.

In some embodiments, the second insulating member is covered on the outer surface of the electrode assembly in a circumferential direction of the housing, and in the circumferential direction of the housing, two end portions of the second insulating member respectively form the third insulating portion and the fourth insulating portion. By covering the second insulating member on the outer surface of the electrode assembly in a circumferential direction of the housing, more regions of the outer surface of the electrode assembly can be rapidly covered, thereby improving the insulation between the electrode assembly and the housing. When the second insulating member is covered on the outer surface of the electrode assembly in the circumferential direction of the housing and the two end portions of the second insulating member overlap, the second thickened region can be formed, with a simple method for forming the second thickened region.

In some embodiments, the second thickened region completely covers the welding mark region. Increasing the overlap region between the second thickened region and the welding mark region further reduces the risk of the welding mark region piercing through the second insulating member.

In some embodiments, the welding mark region includes a second protruding portion that protrudes from the inner surface of the housing, wherein a height of the second protruding portion protruding from the inner surface of the housing is $H_2$, and a thickness of the second thickened region is $D_2$, wherein $H_2 < D_2$. In this way, even if the second protruding portion fully penetrates the second thickened region, it is unlikely to pierce through the second thickened region, thus further reducing the risk of insulation failure between the electrode assembly and the housing.

In some embodiments, the shell is a rectangular housing, which is suitable for rectangular battery cells, thereby meeting the requirements for large-capacity battery cells.

In some embodiments, openings are formed at opposite ends of the housing along a length direction of the housing. A length of the housing is a, a width of the housing is b, and a height of the housing is c, satisfying a condition of $b \leq c \leq a/1.5$. The housing has an elongated shape, which is beneficial for increasing the energy density of the battery cell.

In some embodiments, openings are formed at opposite ends of the housing. The battery cell further includes end covers, each of the end covers corresponding to an opening, with the end covers sealing the openings. During the assembly of the battery cell, the electrode assembly can enter the housing through the opening at either end of the housing, thus effectively enhancing the assembly efficiency of the battery cell.

In a second aspect, the embodiments of the present disclosure provide a battery, comprising any one of the battery cells provided in any embodiment of the first aspect.

In a third aspect, the embodiments of the present disclosure further provide electrical equipment, which includes the battery cell provided in any of the embodiments as described in the first aspect. The battery cell is configured to supply electric energy.

Figure 1:
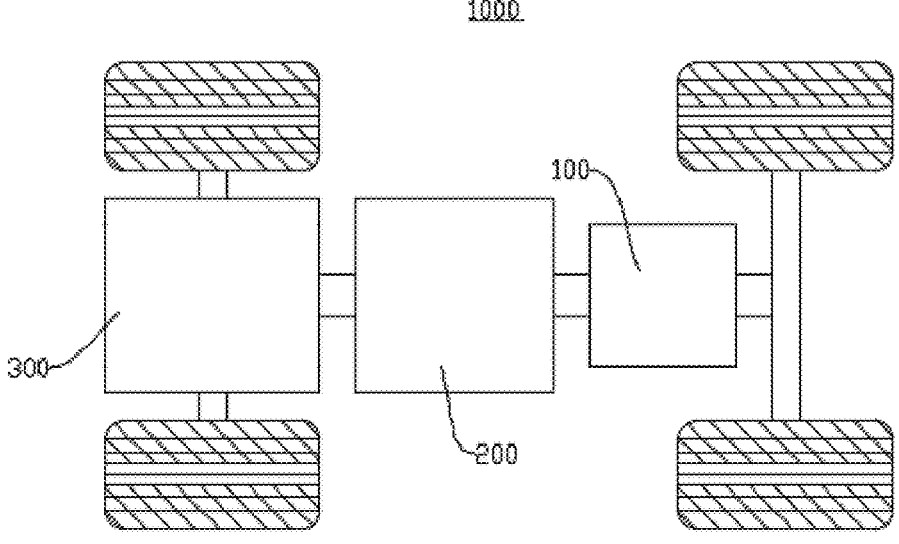
FIG. 1 is a schematic diagram of a structure of a vehicle provided by some embodiments of the present disclosure.

Reference numerals: 1—shell; 11—housing; 111—welding mark region; 1111—first protruding portion; 1112—second protruding portion; 112—wall portion; 1121—first wall portion; 11211—first end portion; 11212—second end portion; 11213—first end face; 11214—second end face; 11215—second overlapping region; 1122—second wall portion; 113—corner portion; 12—end cover; 2—electrode assembly; 21—tab; 3—first insulating member; 31—first thickened region; 32—first insulating portion; 33—second insulating portion; 4—second insulating member; 41—second thickened region; 42—third insulating portion; 43—fourth insulating portion; 5—electrode terminal; 6—pressure relief mechanism; 10—battery cell; 20—box body; 201—first part; 202—second part; 100—battery; 200—controller; 300—motor; 1000—vehicle; X—first direction; Y—second direction; Z—third direction.

DETAILED DESCRIPTION OF EMBODIMENTS

In order to make the objective, technical solution, and advantages of the embodiments of the present disclosure clearer, the following will provide a clear and complete description of the technical solution in the embodiments of the present disclosure, in conjunction with the drawings in the embodiments of the present disclosure. Obviously, the described embodiments are only a part of the embodiments of the present disclosure, rather than all embodiments. Based on the embodiments in the present disclosure, all other embodiments obtained by those of ordinary skill in the art without making inventive efforts are within the scope of protection of the present disclosure.

Unless otherwise defined, all technical and scientific terms used herein have the same meaning as understood by those skilled in the art of the relevant technical field. The terms used in the summary of the present disclosure are used for the purpose of describing specific embodiments and are not intended to limit the present disclosure. The terms, "comprise", "provide" and their variations, and any other variations, are intended to cover non-exclusive inclusion in the summary, the claims, and the above drawings of the present disclosure. The terms "first", "second", and so on in the summary and claims of the present disclosure or in the above drawings are used to distinguish between different objects and are not intended to describe a specific sequence or hierarchy.

The term "embodiment" used in the present disclosure means that specific features, structures, or characteristics described in conjunction with the embodiments can be included in at least one embodiment of the present disclosure. The use of the phrase in various parts of the summary does not necessarily refer to the same embodiment, nor does it imply that these embodiments are mutually exclusive or independent of each other.

In the description of the present disclosure, it should be noted that, unless otherwise clearly stipulated and limited, the terms "provide", "interconnect", "connect", and "attach" should be understood in a broad sense. For example, it can be a fixed connection, a detachable connection, or an integral connection; and it can be a direct connection, an indirect connection through an intermediary, or an internal communication between two components. Those of ordinary skill in the art can understand the meanings of the above terms in the present disclosure according to specific situations.

In the present disclosure, the term "and/or" is used as a way to describe the relationship between associated objects, indicating that there can be three possible relationships. For example, "A and/or B" can represent: the presence of A, the presence of both A and B, or the presence of B. Additionally, the character "/" in the present disclosure generally represents an "or" relationship between the preceding and following associated objects.

In the embodiments of the present disclosure, identical reference numerals indicate the same components. For the sake of conciseness, detailed explanations of the same components are omitted in different embodiments. It should be understood that the dimensions such as thickness, length, and width of various components in the embodiments of the embodiments of the present disclosure as shown in the drawings, and the overall dimensions such as thickness, length, and width of the integrated device, are provided as illustrative examples and should not be construed to limit the scope of the present disclosure.

In the present disclosure, the term "multiple" refers to two or more (including two).

In the embodiment of the present disclosure, the battery cell can be a secondary battery, where the secondary battery refers to a battery cell that can be recharged to activate the active material and continue to be used after the battery cell has been discharged.

The battery cell can include lithium-ion batteries, sodium-ion batteries, sodium-lithium-ion batteries, lithium metal batteries, sodium metal batteries, lithium-sulfur batteries, magnesium-ion batteries, nickel-metal hydride batteries, nickel-cadmium batteries, lead-acid batteries, etc. The embodiment of the present disclosure is not limited herein.

The battery cell generally includes an electrode assembly. The electrode assembly includes a positive electrode, a negative electrode, and an isolation member. During the charge and discharge process of the battery cell, active ions (such as lithium ions) are embedded and extracted back and forth between the positive electrode and the negative electrode. The isolation member is arranged between the positive electrode and the negative electrode, which can prevent short circuits between the positive and negative electrodes and allow active ions to pass through.

In some embodiments, the positive electrode can be a positive electrode sheet, and the positive electrode sheet can include a positive electrode current collector and positive electrode active material arranged on at least one surface of the positive electrode current collector.

As an example, the positive electrode current collector comprises two surfaces opposite each other in the thickness direction, and the positive electrode active material is provided on either or both of the two surfaces opposite the positive electrode current collector.

As an example, the positive electrode current collector can be made of a metal foil or composite current collector. For instance, as a metal foil, materials such as aluminum or stainless steel with silver surface treatment, stainless steel, copper, aluminum, nickel, carbon electrode, carbon, nickel, or titanium can be used. The composite current collector can include a polymer material base layer and a metal layer. The composite current collector can be formed by forming metallic materials (aluminum, aluminum alloys, nickel, nickel alloys, titanium, titanium alloys, silver and silver alloys, etc.) onto a base material of polymeric material (e.g., substrates of polypropylene, polyethylene terephthalate, polybutylene terephthalate, polystyrene, polyethylene, etc.).

As an example, the positive electrode active material can comprise at least one of the following materials: a lithium-containing phosphate, a lithium transition metal oxide, and respective modified compounds thereof. However, the present disclosure is not limited to these materials, and other conventional materials that can be utilized as positive electrode active material for battery cathodes can also be used. These positive electrode active materials can be used in only one alone or in a combination of more than two. The examples of lithium-containing phosphate can comprise, but are not limited to, at least one of a composite of lithium iron phosphate (e.g., LiFePO4, also referred to as LFP), lithium iron phosphate, and carbon; a composite of lithium manganese phosphate (e.g., LiMnPO4), lithium manganese phosphate, and carbon; and a composite of lithium ferromanganese phosphate, lithium manganese iron phosphate, and carbon. The examples of the lithium transition metal oxides can comprise, but are not limited to, lithium cobalt oxides (e.g., $LiCoO_2$), lithium nickel oxides (e.g., $LiNiO_2$), lithium manganese oxides (e.g., $LiMnO_2$, $LiMn_2O_4$), lithium-nickel-cobalt oxides, lithium-manganese-cobalt oxides, lithium-nickel-cobalt-manganese oxides (e.g., $LiNi_{1/3}Co_{1/3}Mn_{1/3}O_2$, also referred to as $NCM_{333}$; $LiNi_{0.5}Co_{0.2}Mn_{0.3}O_2$, also referred to as $NCM_{523}$; $LiNi_{0.5}Co_{0.25}Mn_{0.25}O_2$, also referred to as $NCM_{211}$; $LiNi_{0.6}Co_{0.2}Mn_{0.2}O_2$, also referred to as $NCM_{622}$; $LiNi_{0.8}Co_{0.25}Mn_{0.1}O_2$, also referred to as $NCM_{811}$); lithium-nickel-cobalt-aluminum oxides (e.g., $LiNi_{0.85}Co_{0.15}Al_{0.05}O_2$), and modified compounds thereof, and the like.

In some embodiments, the positive electrode can be of a foam metal. The foam metal can be nickel foam, copper foam, aluminum foam, foam alloys, or carbon foam. When the foam metal is used as the positive electrode, the surface of the foam metal can be not arranged with the positive electrode active material, although the positive electrode active material can also be provided. As an example, lithium source material, potassium metal, or sodium metal can be filled or/and deposited inside the foam metal, where the lithium source material is lithium metal and/or lithium-rich material.

In some embodiments, the negative electrode can be a negative electrode sheet, and the negative electrode sheet can include a negative electrode current collector.

For example, the negative electrode current collector can be made of a metal foil, foam metal, or composite current collector. For instance, as a metal foil, materials such as aluminum or stainless steel with silver surface treatment, stainless steel, copper, aluminum, nickel, carbon electrode, carbon, nickel, or titanium can be used. Foam metals can be nickel foam, copper foam, aluminum foam, foam alloys, or carbon foam. The composite current collector can include a polymer material base layer and a metal layer. The composite current collector can be formed by forming metallic materials (copper, copper alloys, nickel, nickel alloys, titanium, titanium alloys, silver and silver alloys, etc.) onto a base material of polymeric material (e.g., substrates of polypropylene, polyethylene terephthalate, polybutylene terephthalate, polystyrene, and polyethylene).

As an example, the negative electrode sheet can include a negative electrode current collector and a negative electrode active material provided on at least one surface of the negative electrode current collector.

As an example, the negative electrode current collector comprises two surfaces opposite each other in its thickness direction, and the negative electrode active material is provided on either or both of the two surfaces opposite the negative electrode current collector.

As an example, the negative electrode active material can be a negative electrode active material known in the art for use in the battery cells. As an example, the negative electrode active material can comprise at least one of the following materials: artificial graphite, natural graphite, soft carbon, hard carbon, silicon-based materials, tin-based materials, and lithium titanate. The silicon-based materials can be selected from at least one of elemental silicon, silicon oxides, silicon-carbon composites, silicon-nitrogen composites, and silicon alloys. The tin-based materials can be chosen from at least one of elemental tin, tin oxides, and tin alloys. However, the present disclosure is not limited to these materials, and other conventional materials that can be utilized as negative electrode active material for battery cathodes can also be used. The negative electrode active material can be used in only one alone or in a combination of more than two.

In some embodiments, the material of the positive electrode current collector can be aluminum and the material of the negative electrode current collector can be copper.

In some implementations, the electrode assembly further comprises an isolation member, and the isolation member is provided between the positive electrode and the negative electrode.

In some embodiments, the isolation member is a separator. The present disclosure does not impose specific restrictions on the type of separator and allows for the selection of any well-known porous structure separator with good chemical and mechanical stability.

As an example, the main material of the separator can be selected from at least one of glass fiber, nonwoven fabric, polyethylene, polypropylene, polyvinylidene fluoride, and ceramic. The separator can be a single-layer film or a multi-layer composite film, with no specific limitations. When the separator is a multi-layer composite film, the materials for each layer can be the same or different, with no specific restrictions. The isolation member can be a separate component arranged between the positive and negative electrodes or can be attached to the surface of the positive and negative electrodes.

In some embodiments, the isolation member is a solid electrolyte. The solid electrolyte is arranged between the positive electrode and the negative electrode and serves both to transport ions and to isolate the positive and negative electrodes.

In some embodiments, the battery cell also includes an electrolyte, and the electrolyte conducts ions between the positive and negative electrodes. The present disclosure does not impose specific restrictions on the type of electrolyte and allows for selection based on requirements. The electrolyte can be in a liquid state, gel state, or solid state, wherein the liquid electrolyte includes electrolyte salts and solvents.

In some embodiments, the electrolyte salts can be selected from at least one of lithium hexafluorophosphate, lithium tetrafluoroborate, lithium perchlorate, lithium hexafluoroarsenate, lithium bis (oxalato) borate, lithium bis (trifluoromethanesulfonyl) imide, lithium trifluoromethanesulfonate, lithium difluorophosphate, lithium difluoroborate, lithium bis (oxalato) boronate, lithium bis (oxalato) phosphate, and lithium bis (trifluoromethanesulfonyl) phosphate.

In some embodiments, the solvents can be selected from at least one of ethylene carbonate, propylene carbonate, methyl acetate, diethyl carbonate, dimethyl carbonate, dipropyl carbonate, methyl propionate, ethyl propionate, butyl acetate, fluoroethylene carbonate, methyl formate, methyl acetate, ethyl acetate, propyl acetate, methyl propionate, ethyl propionate, propyl propionate, methyl butyrate, ethyl butyrate, 1,4-butanolide, γ-butyrolactone, dimethyl sulfoxide, methyl ethyl sulfoxide, and dimethyl sulfoxide. The solvent can also be selected from ether solvents. Ether solvents can include one or more of the following: ethylene glycol dimethyl ether, ethylene glycol diethyl ether, diethylene glycol dimethyl ether, triethylene glycol dimethyl ether, tetraethylene glycol dimethyl ether, 1,3-dioxolane, tetrahydrofuran, methyl tetrahydrofuran, diphenyl ether, and crown ethers.

The gel electrolyte includes a polymer as the electrolyte framework network, combined with ionic liquid-lithium salt, wherein the solid-state electrolyte includes polymer solid-state electrolyte, inorganic solid-state electrolyte, and composite solid-state electrolyte.

As an example, the polymer solid-state electrolyte can be polyethylene oxide (PEO), polysiloxane, polycarbonate, polyacrylonitrile, polyvinylidene fluoride, polymethyl methacrylate, single-ion polymers, polymer ionic liquids-lithium salts, and cellulose.

As an example, the inorganic solid-state electrolyte can be one or more of the following: oxide solid electrolytes (crystalline perovskite, sodium superionic conductor, garnet, amorphous LiPON thin film); sulfide solid electrolytes (crystalline lithium superionic conductors such as lithium germanium phosphorus sulfide and argyrodite, amorphous sulfides); halide solid electrolytes; nitride solid electrolytes; and hydride solid electrolytes.

As an example, the composite solid-state electrolyte is formed by adding inorganic solid-state electrolyte fillers into the polymer solid-state electrolyte.

In some embodiments, the electrode assembly is of a wound structure. The positive electrode sheet and the negative electrode sheet are wound into a wound structure.

In some embodiments, the electrode assembly is of a stacked structure.

As an example, multiple positive electrode sheets and negative electrode sheets can be provided, with the positive electrode sheets and the negative electrode sheets arranged alternately in layers.

As an example, multiple positive electrode sheets can be provided, with the negative electrode sheet folded to form multiple stacked fold segments, wherein a positive electrode sheet is sandwiched between adjacent fold segments.

As an example, both positive electrode sheets and negative electrode sheets can be folded to form multiple stacked fold segments.

As an example, multiple isolation members can be provided, each arranged between any adjacent positive electrode sheets or negative electrode sheets.

As an example, the isolation members can be continuously arranged, in a folded or wound manner, between any adjacent positive electrode sheets or negative electrode sheets.

In some embodiments, the electrode assembly can have shapes such as cylindrical, flat, or prismatic.

In some embodiments, the electrode assembly can include tabs, and the tabs can conduct current out of the electrode assembly. The tab includes a positive tab and a negative tab.

In some embodiments, the battery cell can include a shell. The shell is configured to encapsulate the electrode assembly, electrolyte, and other components. The shell can be made of materials such as steel, aluminum, plastic (e.g., polypropylene), composite metal (e.g., copper-aluminum composite housing), or aluminum-plastic film.

As an example, the battery cell can be cylindrical battery cells, prismatic battery cells, soft pouch battery cells, or battery cells of other shapes. The prismatic cells include square battery cells, blade battery cells, and multi-prismatic battery cells; and the multi-prismatic battery cells can be, for example, hexagonal battery cells. The present disclosure is not particularly limited herein.

The batteries mentioned in the embodiments of the present disclosure refer to a single physical module that comprises one or multiple battery cells to provide higher voltage and capacity.

In some embodiments, the battery can be a battery module. When multiple battery cells are provided, the multiple battery cells are arranged and fixed to form a module.

In some embodiments, the battery can be a battery pack, and the battery pack includes a box and a battery cell, wherein the battery cell or the battery module is housed within the box body.

In some embodiments, the box body can be of a portion of the chassis structure of the vehicle. For instance, a portion of the box body can be at least a portion of the floor of the vehicle, or a portion of the box body can be at least a portion of the crossbeam and longitudinal beam of the vehicle.

In some embodiments, the battery can be an energy storage device. The energy storage device includes storage containers, energy storage cabinets, and the like.

In a battery module, an insulating member is typically arranged on the outer side of the housing to ensure the insulation of the battery cell, thus reducing the risk of short circuits that could cause fire or explosion.

The housing, being a critical component of the battery cell, is generally formed from a base material via stamping or stretching. During the forming process, the base material is subjected to increased pressure, which can lead to damage. The formation of the base material is difficult, especially for long, thin-walled housings.

To reduce the forming difficulty of the housing, the housing can be formed by welding a sheet. After forming the housing, a welding mark region is formed at the welding position. The welding mark region can impact the insulating members located on the outer side of the housing. The welding mark region can puncture the insulating member, leading to the failure of insulation in the battery cell.

To address this, the embodiment of the present disclosure provides a battery cell. By arranging a first thickened region on the first insulating member located on the outer side of the housing, wherein the first thickened region covers at least a portion of the welding mark region, this reduces the risk of the welding mark region piercing through the first insulating member, which could cause insulation failure of the battery cell. Thus, the insulation performance of the battery cell is improved.

The battery cells described in the embodiments of the present disclosure are applicable to batteries and electrical equipment that utilize the battery cells.

The electrical equipment can include vehicles, mobile phones, portable devices, laptops, ships, spacecraft, electric toys, electric tools, and more. Vehicles can be gasoline cars, gas cars, or new energy vehicles. New energy vehicles can include pure electric vehicles, hybrid vehicles, or extended-range vehicles. Aerospace vehicles comprise airplanes, rockets, spaceplanes, and spacecraft, among others. Electric toys include stationary or mobile electric toys, for example, video game consoles, electric car toys, electric boat toys, and electric airplane toys. Electric tools include metal cutting electric tools, grinding electric tools, assembly electric tools, and railway electric tools, for example, electric drills, electric sanders, electric wrenches, electric screwdrivers, electric hammers, impact drills, concrete vibrators, and electric planers. The embodiments of the present disclosure do not impose any specific restrictions on the aforementioned electrical equipment.

The following embodiments are explained using the example of vehicles as the electrical equipment for the sake of convenience.

Referring to FIG. 1, FIG. 1 is a schematic diagram of a structure of a vehicle 1000 provided in some embodiments of the present disclosure. A battery 100 is provided inside the vehicle 1000, wherein the battery 100 can be arranged at the bottom, front, or rear of the vehicle 1000. The battery 100 is configured to provide power for the vehicle 1000. For instance, the battery 100 can be the operational power source for the vehicle 1000.

Additionally, the vehicle 1000 also comprises a controller 200 and a motor 300. The controller 200 is configured to manage the supply of power from the battery 100 to the motor 300, for example, for working power requirements for starting, navigating, and driving the vehicle 1000.

In some embodiments of the present disclosure, the battery 100 serves not only as the operational power source for the vehicle 1000 but also as the driving power source for the vehicle 1000. It can replace or partially substitute for conventional fuels like gasoline or natural gas to provide driving propulsion for the vehicle 1000.

Figure 2:
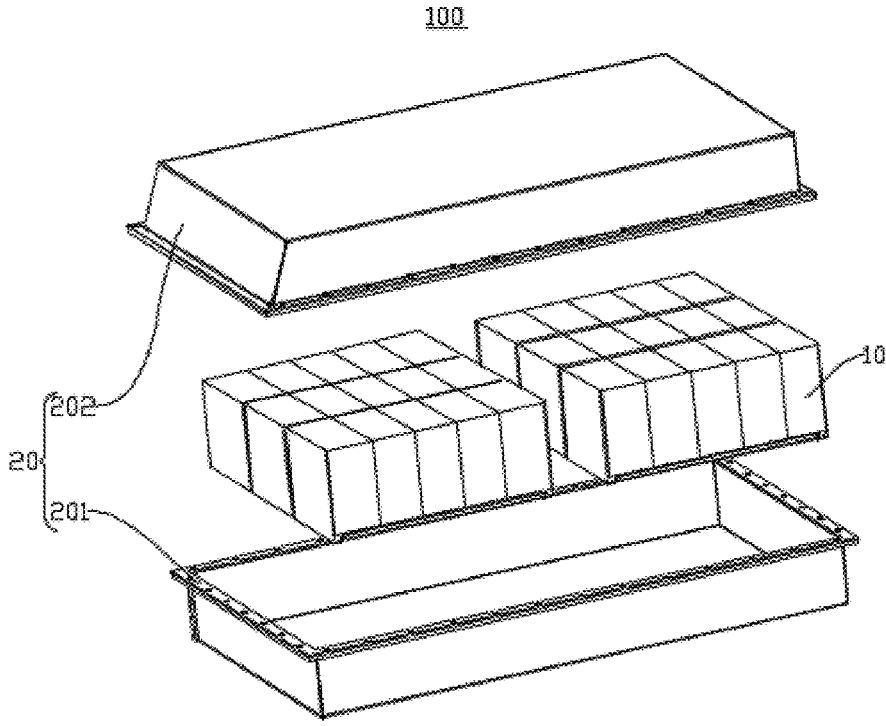
FIG. 2 is an exploded view of a battery provided by some embodiments of the present disclosure.

Referring to FIG. 2, FIG. 2 is an exploded view of a battery 100 provided in some embodiments of the present disclosure. The battery 100 comprises a battery cell 10 and a box body 20, wherein the battery cell 10 is housed in the box body 20.

The box body 20 is a component that houses the battery cell 10, and the box body 20 provides a containment space for the battery cell 10. The box 20 can have various structures. In some embodiments, the box body 20 can comprise a first part 201 and a second part 202, wherein the first part 201 and the second part 202 are capped with each other to define the containment space configured to accommodate the battery cell 10. The first part 201 and the second part 202 can have various shapes, such as rectangular and cylindrical. The first part 201 can be a hollow structure open on one side, and the second part 202 can also be a hollow structure open on one side. The open side of the second part 202 can be capped over the open side of the first part 201, thereby forming a box body 20 with a containment space. It is also possible for the first part 201 to be a hollow structure open on one side, and the second part 202 to be a plate-like structure. The second part 202 can be capped over the open side of the first part 201, thereby forming a box body 20 with a containment space. The first part 201 and the second part 202 can be sealed using sealing components, wherein the sealing components can include sealing rings, sealing adhesive, and so on.

In the battery 100, the battery cell 10 can be one or multiple. If multiple battery cells 10 are provided, the multiple battery cells 10 can be connected in series, parallel, or hybrid. Hybrid connection refers to having both series and parallel connections among multiple battery cells 10. The multiple battery cells 10 can be first connected in series, parallel, or hybrid to form battery modules, and then the multiple battery modules can be connected in series, parallel, or hybrid to form a whole, which is accommodated in the box body 20. Alternatively, all battery cells 10 can be directly connected in series, parallel, or hybrid, and the whole formed by all the battery cells 10 is then accommodated in the box body 20.

Figure 3:
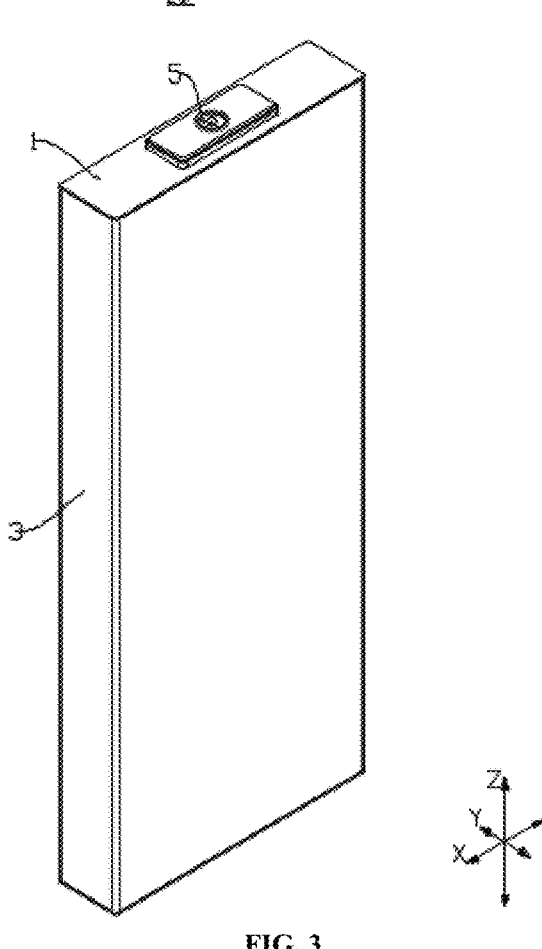
FIG. 3 is an axonometric view of a battery cell provided by some embodiments of the present disclosure.
Figure 4:
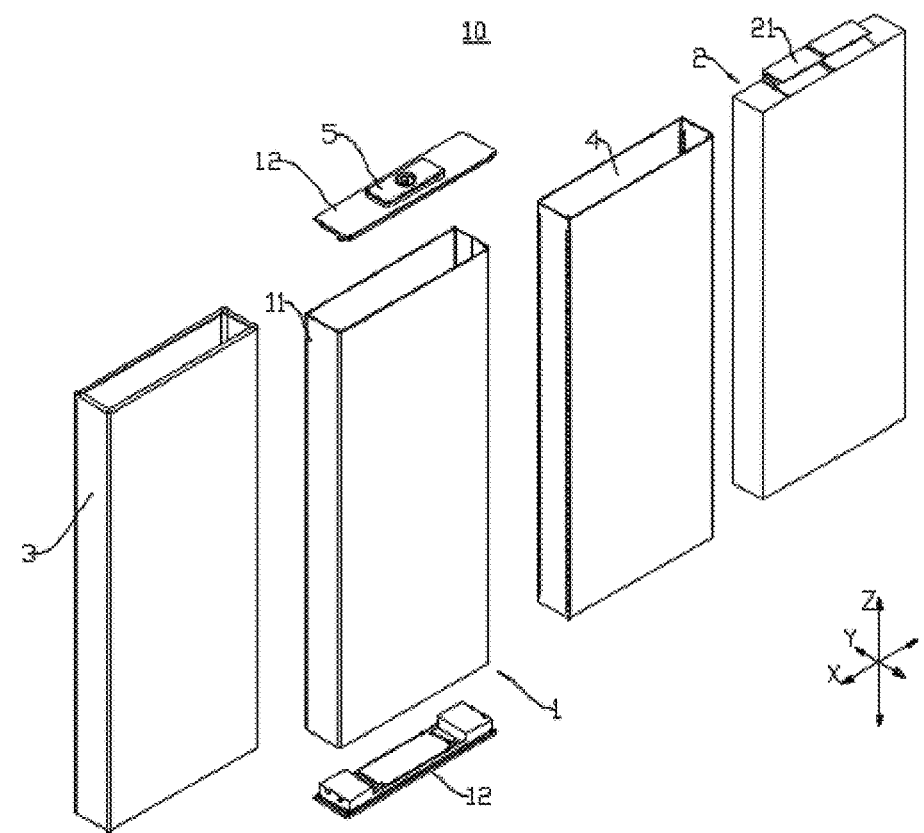
FIG. 4 is an exploded view of a battery cell shown in FIG. 3.
Figure 5:
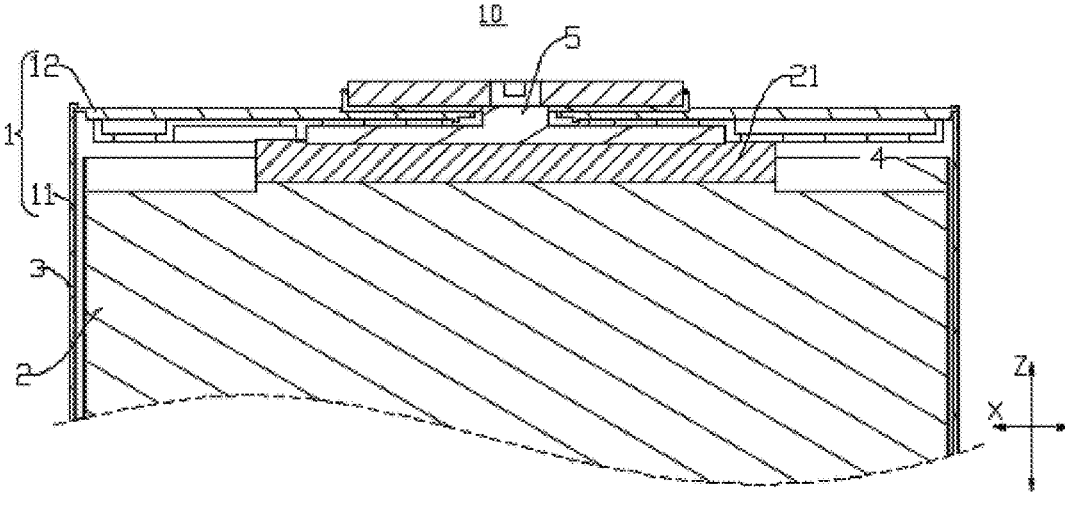
FIG. 5 is a partial sectional view of a battery cell shown in FIG. 3.
Figure 6:
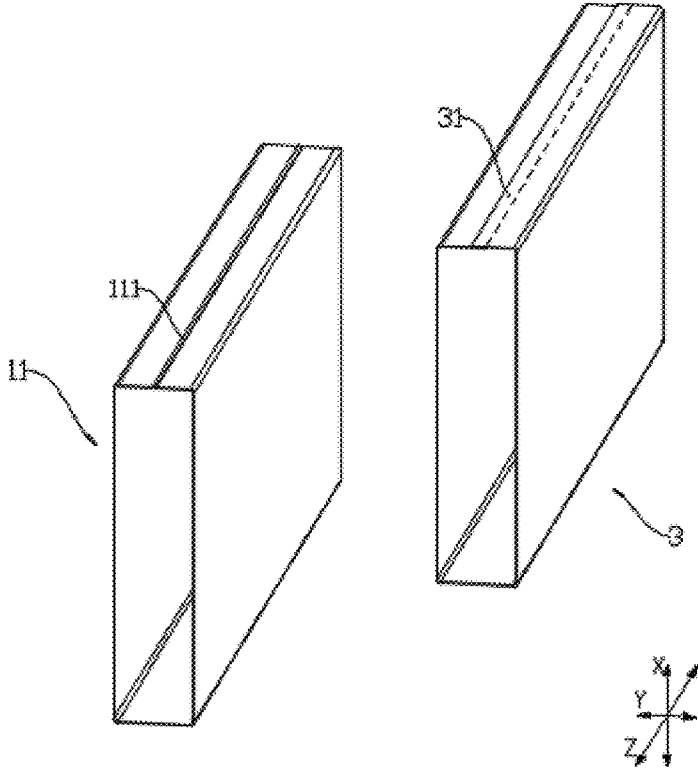
FIG. 6 is an exploded view of a housing and a first insulating member provided by some embodiments of the present disclosure.

Referring to FIGS. 3 to 5, FIG. 3 is an axonometric view of a battery cell 10 provided by some embodiments of the present disclosure; FIG. 4 is an exploded view of a battery cell 10 shown in FIG. 3; and FIG. 5 is a partial sectional view of the battery cell 10 shown in FIG. 3. The battery cell 10 can comprise a shell 1, an electrode assembly 2, a first insulating member 3, and a second insulating member 4.

The shell 1 is a component configured to accommodate the electrode assembly 2 and the electrolyte. As an example, the shell 1 can include a housing 11 and an end cover 12.

The housing 11 can be a hollow structure with an opening formed at one end, or the housing 11 can be a hollow structure with openings formed at two opposite ends. The housing 11 can be in various shapes, such as cylindrical shape and rectangular shape. The material of the housing 11 can be diverse, such as copper, iron, aluminum, steel, and aluminum alloy.

The end cover 12 is a component that seals the opening of the housing 11, thereby isolating the internal environment of the battery cell 10 from the external environment. The end cover 12, together with the housing 11, defines a sealed space configured to accommodate the electrode assembly 2, electrolyte, and other components. The end cover 12 can be connected to the housing 11 in the manner of welding or crimping to seal the opening of the housing 11. The shape of the end cover 12 can be adapted to the shape of the shell 1. For example, if the housing 11 is of a cuboid structure, the end cover 12 can be a rectangular plate-like structure that fits with the shell 1. Similarly, if the housing 11 is of a cylindrical structure, the end cover 12 can be a circular plate-like structure that fits with the housing 11. The material of the end cover 12 can also be diverse, including copper, iron, aluminum, steel, aluminum alloy, and more. The material of the end cover 12 can be the same as or different from the material of the housing 11.

In the embodiment where the housing 11 forms an opening at one end, one end cover 12 can be provided correspondingly. In embodiments where the housing 11 forms openings at both ends, two end caps 12 can correspondingly be arranged. These two end covers 12 respectively seal the two openings of the housing 11; and together with the housing 11, the two end covers 12 define an accommodating space.

The first insulating member 3 is a component provided on the outer side of the housing 11 to achieve insulation of the battery cell 10. The first insulating member 3 is made of insulating material, which can be plastic, rubber, etc.

The second insulating member 4 is a component provided on the inner side of the housing 11 to achieve insulation and separation between the housing 11 and the electrode assembly 2. The second insulating member 4 is made of insulating material, which can be plastic, rubber, etc.

In some embodiments, the battery cell 10 can also comprise electrode terminals 5, wherein the electrode terminals 5 are arranged on the shell 1. The electrode terminals 5 are configured to establish electrical connections with the tabs 21 of the electrode assembly 2, thus enabling the output of electrical energy from the battery cell 10. The electrode terminal 5 can be provided on the housing 11 of the shell 1, or it can be provided on the end cover 12 of the shell 1. The electrode terminal 5 can be directly connected to the tabs 21, for example, by direct welding the electrode terminals 5 to the tabs 21. Or, the electrode terminals 5 can be indirectly connected to the tabs 21, for example, the electrode terminals 5 and the tabs 21 are connected indirectly via a current collector. The current collector can be a metallic conductor, such as copper, iron, aluminum, steel, aluminum alloy, etc.

As an example, as shown in FIG. 3 to FIG. 5, the housing 11 is a hollow structure with openings formed at two opposite ends. The two opposite ends of the housing 11 are each provided with an end cover 12. The end covers 12 at both ends of the housing 11 are each provided with an electrode terminal 5. The opposing ends of the electrode assembly 2 are each formed with a tab 21. The tab 21 at one end of the electrode assembly 2 is the positive tab, and the tab 21 at the other end of the electrode assembly 2 is the negative tab. One electrode terminal 5 on the end cover 12 is electrically connected to the positive tab, and the other electrode terminal 5 on the end cover 12 is electrically connected to the negative tab.

Figure 7:
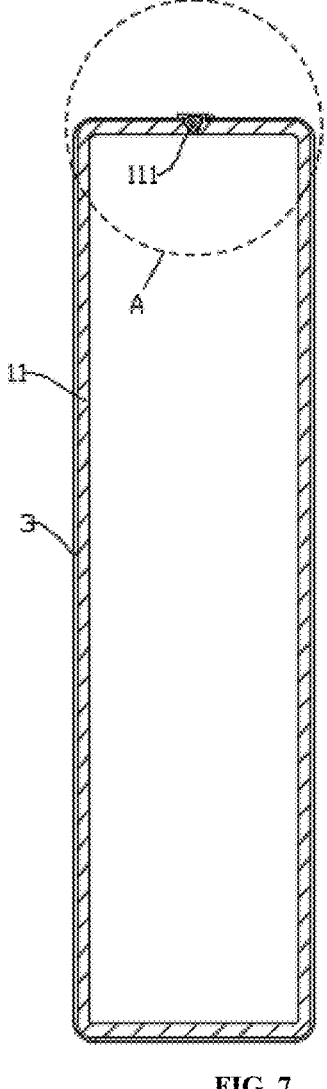
FIG. 7 is an assembly view of a housing and a first insulating member shown in FIG. 6.
Figures 8, 9:
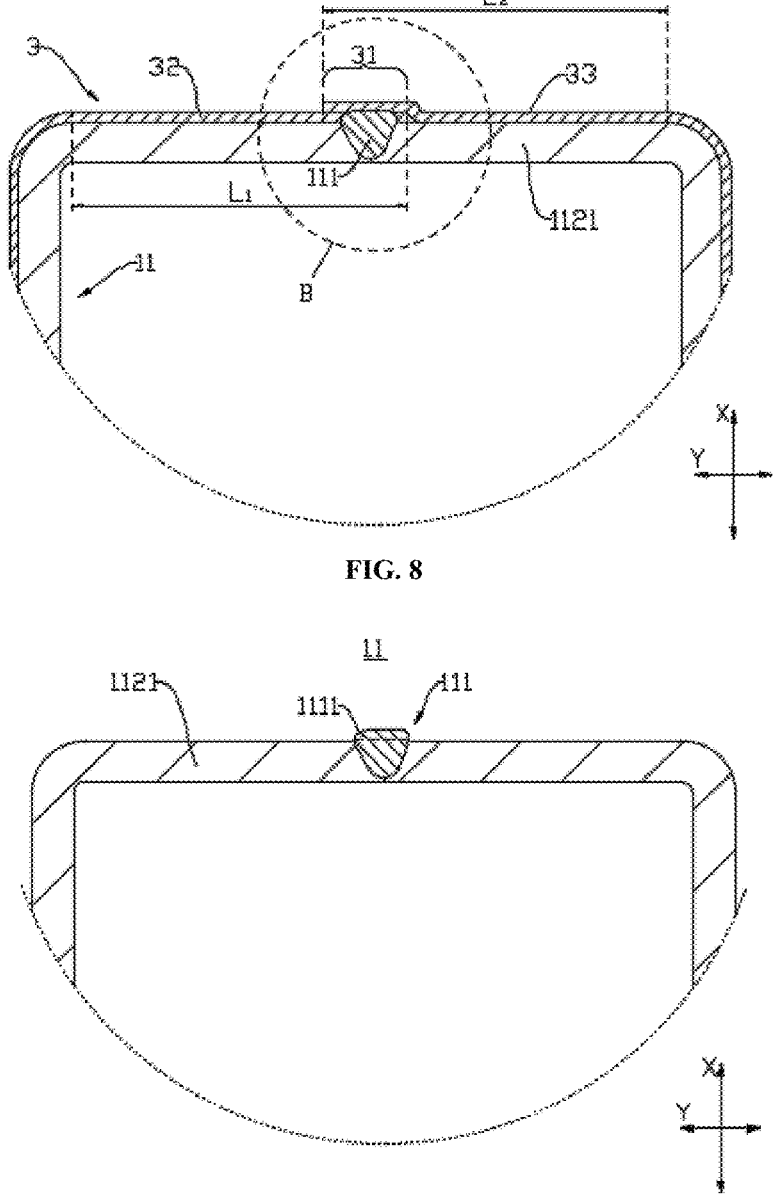
FIG. 8 is an enlarged partial view at A in FIG. 7.
FIG. 9 is a partial view of a housing shown in FIG. 8.

Referring to FIGS. 6 to 9, FIG. 6 is an exploded view of a housing 11 and a first insulating member 3 provided by some embodiments of the present disclosure; FIG. 7 is an assembly view of a housing 11 and a first insulating member 3 shown in FIG. 6; FIG. 8 is an enlarged partial view at A in FIG. 7; and FIG. 9 is a partial view of a housing 11 shown in FIG. 8. The present disclosure provides an embodiment of a battery cell 10, including a housing 11 and a first insulating member 3. The housing 11 provides a welding mark region 111. The first insulating member 3 is arranged on an outer surface of the housing 11, and the first insulating member 3 provides a first thickened region 31, wherein the first thickened region 31 covers at least a portion of the welding mark region 111.

The housing 11 can have an opening formed at one end or openings formed at two opposite ends. The housing 11 can be a prismatic cylinder, a cylindrical cylinder, and the like. The prismatic cylinder can be a triangular prism, a quadrangular prism, a pentagonal prism, a hexagonal prism, and the like. The first insulating member 3 can achieve insulation between the battery cells 10. The first insulating member 3 can completely cover the outer surface of the housing 11, or it can cover a portion of the outer surface of the housing 11. The first insulating member 3 can be arranged on the outer surface of the housing 11 along the circumferential direction of the housing 11, where the circumferential direction of the housing 11 coincides with the circumferential direction of the opening of the housing 11.

The first insulating member 3 can be an integrally molded insulating sleeve structure, and the first insulating member 3 can also be formed by a sheet body that surrounds the housing 11. The first insulating member 3 can be formed by connecting the first and last two ends of a sheet body to each other; the first insulating member 3 can also be formed by multiple sheet bodies, with the multiple sheet bodies arranged separately, and the adjacent two sheet bodies connected to each other.

The welding mark region 111 is the welded portion formed by welding two parts together during the molding process of the housing 11, to achieve a fixed connection between the two parts. One or multiple welding mark region 111 on the housing 11 can be provided. For example, the housing 11 is formed by bending a sheet, and the two ends of the sheet are welded to each other to form a welding mark region 111 on the housing 11. For another example, the housing 11 is formed by splicing multiple sheets, and two adjacent sheets are welded together to form a welding mark region 111 at the welding position between the two adjacent sheets, thus forming multiple welding mark regions 111 on the housing 11.

The first thickened region 31 is a locally thickened region on the first insulating member 3. It can be a protrusion formed on the first insulating member 3 to form the first thickened region 31; or the two parts of the first insulating member 3 can overlap with each other, making the overlapping region thicker to form the first thickened region 31.

The first thickened region 31 can correspond one-to-one with the welding mark region 111, or one first thickened region 31 can correspond to multiple welding mark regions 111. The first thickened region 31 covers at least a portion of the welding mark region 111, meaning that the projection of the welding mark region 111 along the thickness direction of the housing 11 is at least partially located within the first thickened region 31. The first thickened region 31 can completely cover the welding mark region 111, meaning that the projection of the welding mark region 111 along the thickness direction of the housing 11 is entirely located within the first thickened region 31. The first thickened region 31 can also cover a portion of the welding mark region 111, meaning that part of the projection of the welding mark region 111 along the thickness direction of the housing 11 is located within the first thickened region 31.

The welding mark region can include the first protruding portion 1111, which protrudes from the outer surface of the housing 11, meaning that the first protruding portion 1111 is the part of the welding mark region 111 that protrudes from the outer surface of the housing 11. The first protruding portion 1111 can be formed by solder or welding slag during the welding process of the housing 11, or the first protruding portion 1111 can be the part that protrudes from the outer surface of the housing 11 after the welding part of the housing 11 has fused. The first insulating member 3 can cover at least a portion of the first protruding portion 1111, meaning that the first insulating member 3 can completely cover the first protruding portion 1111, or it can cover a portion of the first protruding portion 1111.

In the embodiment of the present disclosure, the first thickened region 31 of the first insulating member 3 covers at least a portion of the welding mark region 111. This reduces the risk of the welding mark region 111 piercing through the first insulating member 3, which could cause insulation failure of the battery cell 10. Thus, the insulation performance of the battery cell 10 is improved.

In some embodiments, referring to FIG. 8, the first insulating member 3 includes a first insulating portion 32 and a second insulating portion 33, wherein the first insulating portion 32 and the second insulating portion 33 are arranged on the outer surface of the housing 11. The first insulating portion 32 and the second insulating portion 33 provide a first overlapping region, wherein the first overlapping region forms the first thickened region 31.

The first insulating member 3 can be formed by a single sheet body that surrounds the housing 11, with the first insulating portion 32 and the second insulating portion 33 are two portions integrally formed in the first insulating member 3. The first insulating portion 32 and the second insulating portion 33 can also be arranged separately and connected, for example, the first insulating member 3 can be formed by multiple sheet bodies arranged separately, with the multiple sheet bodies surrounding the housing 11. Adjacent two sheet bodies are connected to each other, and in the adjacent two sheet bodies, one sheet body forms all or a portion of the first insulating portion 32, and the other sheet body forms all or a portion of the second insulating portion 33, with the first insulating portion 32 and the second insulating portion 33 forming the first overlapping region. Of course, two, three, four, or more sheet bodies in the first insulating member 3 can be provided.

The portion where the first insulating portion 32 and the second insulating portion 33 overlap with each other is the first thickened region 31. It can be understood that part of the first thickened region 31 is located in the first insulating portion 32, and another part of the first thickened region 31 is located in the second insulating portion 33. In the first thickened region 31, the first insulating portion 32 and the second insulating portion 33 can be connected in various ways, such as by adhesion and hot-melt connection. The thickness of the first insulating portion 32 and the thickness of the second insulating portion 33 can be equal, or they can be different.

Through the overlapping of the first insulating portion 32 and the second insulating portion 33 to form the first overlapping region, local thickening of the first insulating member 3 is achieved, thereby correspondingly forming the first thickened region 31, with a simple formation method for the first thickened region 31. It can be understood that the first insulating member 3 has two layers of insulating portions in the first overlapping region, and the region is a double-layer structure. For example, in the first thickened region 31, the first insulating portion 32 is located on the side of the second insulating portion 33 facing the housing 11. Even if the welding mark region 111 pierces the first insulating portion 32, it is not easy to pierce the second insulating portion 33. The second insulating portion 33 can still provide good insulation protection, thereby reducing the risk of the welding mark region 111 piercing the first insulating member 3.

In some embodiments, referring to FIGS. 7 and 8, the first insulating member 3 is covered on the outer surface of the housing 11 in a circumferential direction of the housing 11, and in the circumferential direction of the housing 11, two end portions of the first insulating member 3 respectively form the first insulating portion 32 and the second insulating portion 33.

In the embodiment, the first insulating member 3 can be formed by a single sheet body that surrounds the housing 11 along the circumferential direction of the housing 11. The first insulating portion 32 and the second insulating portion 33 are the two end portions of the first insulating member 3, and it can be understood that the two end portions of the first insulating member 3 form the first overlapping region. The portion of the first insulating member 3 that extends positively from an end surface of one end along the circumferential direction of the housing 11 within a region of the first preset distance $L_1$ is an end portion of the first insulating member 3, wherein a length of the portion is equal to the first preset distance $L_1$. The portion of the first insulating member 3 that extends reversely from an end surface of another end along the circumferential direction of the housing 11 within a region of the second preset distance $L_2$ is another end portion of the first insulating member 3, wherein a length of the portion is equal to the second preset distance $L_2$. The first preset distance $L_1$ and the second preset distance $L_2$ can be equal or not equal.

In the embodiments, by covering the first insulating member 3 on the outer surface of the housing 11 in a circumferential direction of the housing 11, more regions of the outer surface of the housing 11 can be rapidly covered, thereby improving the insulation performance of the battery cell 10. When the first insulating member 3 is covered on the outer surface of the housing 11 in the circumferential direction of the housing 11 and the two end portions of the first insulating member 3 overlap, the first thickened region 31 can be formed, with a simple method for forming the first thickened region 31. When the first insulating member 3 is covered on the outer surface of the housing 11, the position of the welding mark region 111 can be more conveniently confirmed, enabling the first thickened region 31 to quickly cover the welding mark region 111, thereby improving production efficiency.

In some embodiments, referring to FIG. 8, the housing 11 includes a first wall portion 1121, and the welding mark region 111 is located on the first wall portion 1121. The first insulating portion 32 and the second insulating portion 33 jointly cover the outer surface of the first wall portion 1121.

The first wall portion 1121 is one of the wall portions of the housing 11. For the first wall portion 1121, which is formed with a welding mark region 111, the first wall portion 1121 includes two parts that are welded together to form the welding mark region 111. For example, in the case of the housing 11 being a rectangular housing, the housing 11 includes four wall portions arranged along the circumferential direction. Two wall portions are arranged oppositely along the width direction of the housing 11, and two wall portions are arranged along the height direction of the housing 11. It is possible that the wall portion along the width direction of the housing 11 is the first wall portion 1121, or the wall portion along the length direction of the housing 11 is the first wall portion 1121.

It is possible that the portion of the first insulating member 3, which is located on the first wall portion 1121, can be the first insulating portion 32 and the second insulating portion 33 so that the first insulating portion 32 and the second insulating portion 33 jointly cover the outer surface of the first wall portion 1121.

In the embodiment, the first insulating portion 32 and the second insulating portion 33 jointly cover the outer surface of the first wall portion 1121 where the welding mark region 111 is formed, thereby achieving insulation of the first wall portion 1121 and improving the insulation performance of the battery cell 10.

In some embodiments, referring to FIG. 8, the first thickened region 31 completely covers the welding mark region 111.

It can be understood that the projection of the welding mark region 111 along the thickness direction of the housing 11 is entirely within the first thickened region 31.

In the embodiment, the first thickened region 31 completely covers the welding mark region 111. Increasing the overlap region between the first thickened region 31 and the welding mark region 111 further reduces the risk of the welding mark region 111 piercing through the first insulating member 3.

Figure 10:
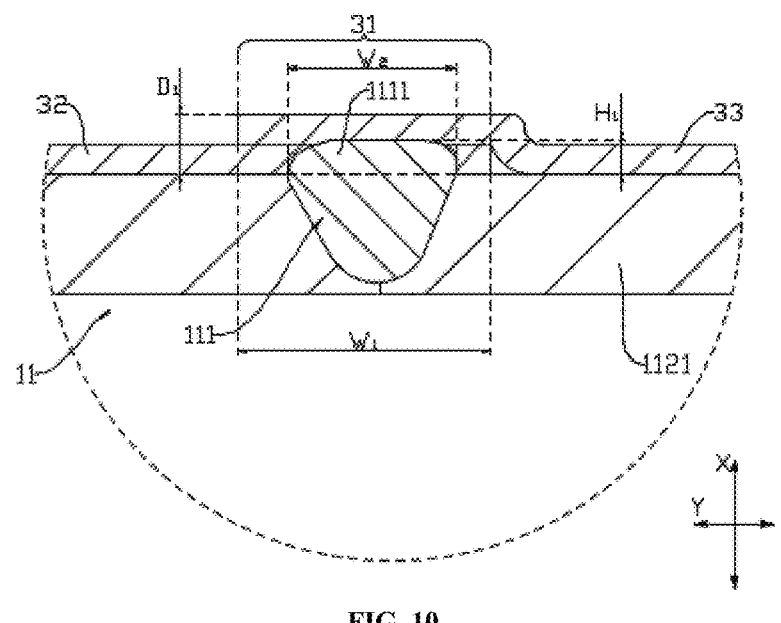
FIG. 10 is an enlarged partial view at B in FIG. 8.

In some embodiments, referring to FIG. 10, FIG. 10 is an enlarged partial view at B in FIG. 8. In the circumferential direction of the housing 11, a width of the first thickened region 31 is $W_1$, and a width of the welding mark region 111 is $W_2$, wherein $W_1 > W_2$.

For example, the housing 11 includes a first wall portion 1121, and the welding mark region 111 is located in the first wall portion 1121. The thickened region is located in the first wall portion 1121 to cover at least a portion of the welding mark region 111. The width direction of the first thickened region 31 and the width direction of the welding mark region 111 are aligned, both being perpendicular to the thickness direction of the first wall portion 1121.

In the present embodiment, $W_1 > W_2$, the first thickened region 31 has more region available to cover the welding mark region 111.

In some embodiments, $W_1 - W_2 \geq 1$ mm.

$W_1 - W_2$ can be any one of the point values 1 mm, 1.5 mm, 2 mm, 2.5 mm, 3 mm, 3.5 mm, 4 mm, 4.5 mm, 5 mm, 5.5 mm, 6 mm, etc., or any range value between any two of them.

In the embodiment, the first thickened region 31 has a larger coverage margin, which facilitates the complete coverage of the welding mark region 111 by the first thickened region 31, meets the alignment accuracy requirements between the first thickened region 31 and the welding mark region 111, and improves the assembly efficiency of the first insulating member 3 with the housing 11.

In some embodiments, $W_1 \geq 3$ mm.

$W_1$ can be any one of the point values 3 mm, 3.5 mm, 4 mm, 4.5 mm, 5 mm, 5.5 mm, 6 mm, 6.5 mm, 7 mm, 7.5 mm, 8 mm, 8.5 mm, 9 mm, 9.5 mm, 10 mm, etc., or any range value between any two of them.

When welding the housing 11, the width of the welding mark region 111 formed by the welding of the housing 11 is generally between 0.2 mm and 2 mm. Therefore, $W_1 \geq 3$ mm, which ensures that the first thickened region 31 has a larger width, is capable of covering more of the welding mark region 111, and facilitates full coverage of the welding mark region 111 by the first thickened region 31.

In some embodiments, referring to FIG. 10, the welding mark region 111 includes a first protruding portion 1111 that protrudes from the outer surface of the housing 11, wherein a height of the first protruding portion 1111 protruding from the outer surface of the housing 11 is $H_1$, and a thickness of the first thickened region 31 is $D_1$, wherein $H_1 < D_1$.

The height direction of the first protruding portion 1111 and the thickness direction of the first thickened region 31 are both consistent with the thickness direction of the first wall portion 1121. Taking the first insulating portion 32 and the second insulating portion 33 of the first insulating member 3 forming the first overlapping region, corresponding to the formation of the first thickened region 31 as an example, the total thickness of the first insulating portion 32 and the second insulating portion 33 is the thickness $D_1$ of the first thickened region 31.

In the present embodiment, $H_1 < D_1$, so even if the first protruding portion 1111 fully penetrates the first thickened region 31, it is unlikely to pierce through the first thickened region 31, thus further reducing the risk of insulation failure in the battery cell 10.

Figures 11, 12:
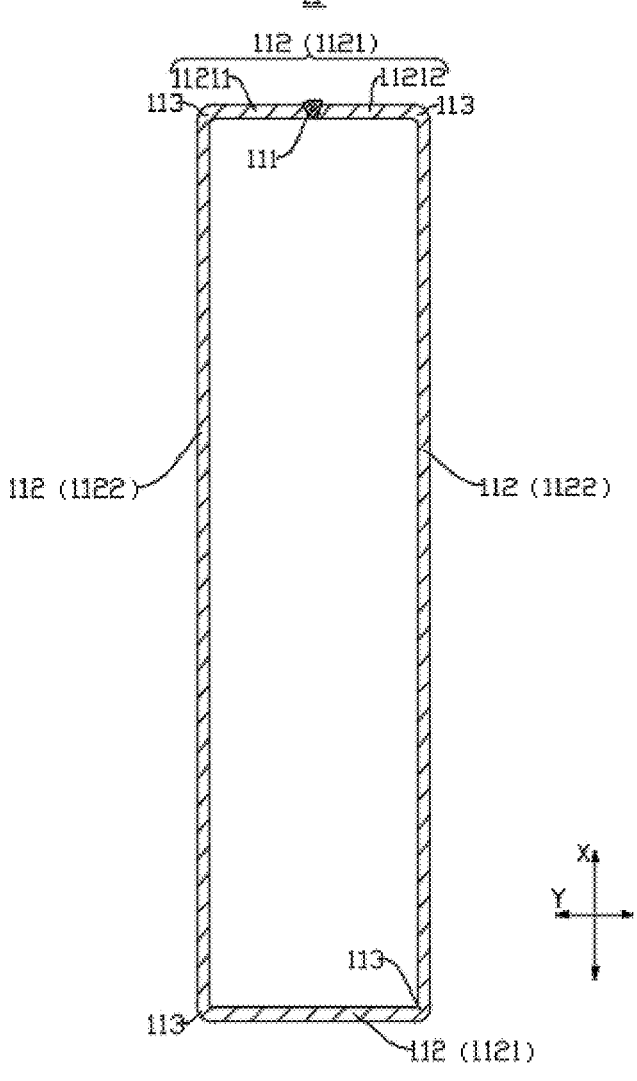
FIG. 11 is a structural schematic diagram of a housing provided by some embodiments of the present disclosure.
FIG. 12 is a structural schematic view of a housing shown in FIG. 11 after unfolding.

In some embodiments, referring to FIG. 11, FIG. 11 is a structural schematic diagram of a housing 11 provided in some embodiments of the present disclosure. The housing 11 is formed by bending a sheet, and in the circumferential direction of the housing 11, the sheet includes a first end portion 11211 and a second end portion 11212, wherein the first end portion 11211 and the second end portion 11212 are welded together to form the welding mark region 111.

The first end portion 11211 and the second end portion 11212 are the two end portions of the sheet material, at the first and last ends of the sheet. The welding mark region 111 is the welding mark portion formed after the first end portion 11211 and the second end portion 11212 are welded together. Thus, the fixed connection between the first end portion 11211 and the second end portion 11212 is achieved through the welding mark region 111.

Before the housing 11 is formed, the sheet can be a rectangular sheet, and the rectangular sheet can be bent to form a cylindrical housing, prismatic housing, etc. The prism can be of a triangular prism, quadrangular prism, pentagonal prism, hexagonal prism, etc. As an example, as shown in FIG. 11, the housing 11 is a rectangular prism housing.

Referring to FIG. 12, FIG. 12 is a structural schematic view of a housing 11 after unfolding, provided by some embodiments of the present disclosure. Before the housing 11 is formed, the sheet has two opposite end faces, and the two end faces are the first end face 11213 and the second end face 11214. The sheet is offset from the first end face 11213 in the direction towards the second end face 11214 by a third preset distance $L_3$, and the portion in the region is the first end portion 11211 of the sheet, with the length of the first end portion 11211 equal to the third preset distance $L_3$. The sheet is offset from the second end face 11214 in the direction towards the first end face 11213 by a fourth preset distance $L_4$, and the portion in the region is the second end portion 11212 of the sheet, with the length of the second end portion 11212 equal to the second preset distance $L_4$. The third preset distance $L_3$ and the fourth preset distance La can be equal or not equal.

As an example, the housing 11 includes multiple wall portions 112 and multiple corner portions 113, and in the circumferential direction of the housing 11, each corner portion 113 connects two adjacent wall portions 112. The welding mark region 111 can be located at the corner portion 113 or at the wall portion 112. As shown in FIG. 11, taking the welding mark region 111 located on the wall portion 112 as an example, the wall portion 112 includes two parts, and the two parts can respectively serve as the first end portion 11211 and the second end portion 11212.

In the embodiment, the method of forming the housing 11 is simple, which can effectively reduce the forming difficulty of the housing 11. Furthermore, when forming the housing 11, it is only necessary to weld the first end portion 11211 and the second end portion 11212 of the sheet and form the welding mark region 111 in the welding region of the first end portion 11211 and the second end portion 11212. Therefore, the housing 11 has good strength.

Figure 13:
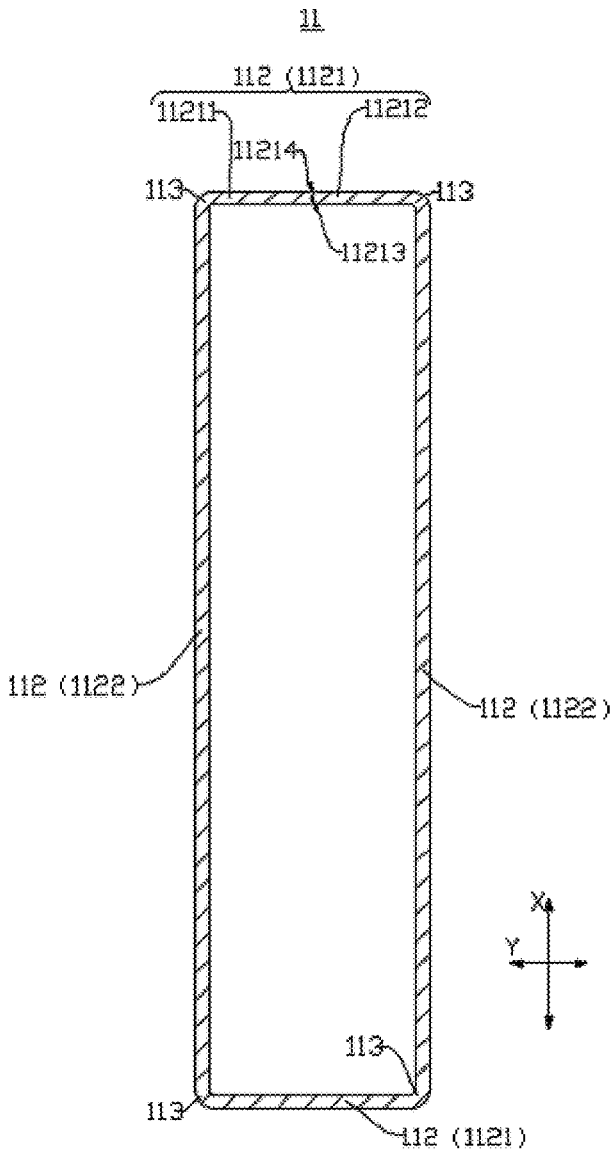
FIG. 13 is a structural schematic view of a housing shown in FIG. 11 with a welding mark region removed.

In some embodiments, referring to FIGS. 11 to 13, FIG. 13 is a structural schematic view of a housing 11 shown in FIG. 11 with a welding mark region 111 removed. An end surface of the first end portion 11211 is welded to an end surface of the second end portion 11212.

The end face of the first end portion 11211 and the end face of the second end portion 11212 are the two opposite end faces of the sheet of the housing 11. The end face of the first end portion 11211 and the end face of the second end portion 11212 are the first end face 11213 and the second end face 11214, respectively. The first end face 11213 and the second end face 11214 can be flat surfaces or curved surfaces, wherein the curved surfaces can be arc surfaces, sawtooth surfaces, etc. The first end face 11213 and the second end face 11214 are welded together, forming a weld seam between the first end face 11213 and the second end face 11214. The welding mark region 111 is formed at the position of the weld seam.

The outer surface of the first end portion 11211 can be flush with the outer surface of the second end portion 11212, and the portion of the welding mark region 111 that protrudes beyond the outer surface of the first end portion 11211 and the outer surface of the second end portion 11212 is the first protruding portion 1111. In the thickness direction of the first end portion 11211, the surface of the first end portion 11211 facing away from the interior of the housing 11 is the outer surface of the first end portion 11211; in the thickness direction of the second end portion 11212, the surface of the second end portion 11212 facing away from the interior of the housing 11 is the outer surface of the second end portion 11212. The thickness direction of the first end portion 11211 is consistent with the thickness direction of the second end portion 11212.

In the embodiment, an end surface of the first end portion 11211 is welded to an end surface of the second end portion 11212. On one hand, no overlapping part is provided between the two end portions of the sheet after connection, which conserves material and reduces the production cost of the housing 11. On the other hand, this makes the housing 11 flatter, increases the internal space of the housing 11, and contributes to the improvement of the energy density of the battery cell 10.

Figures 14, 15:
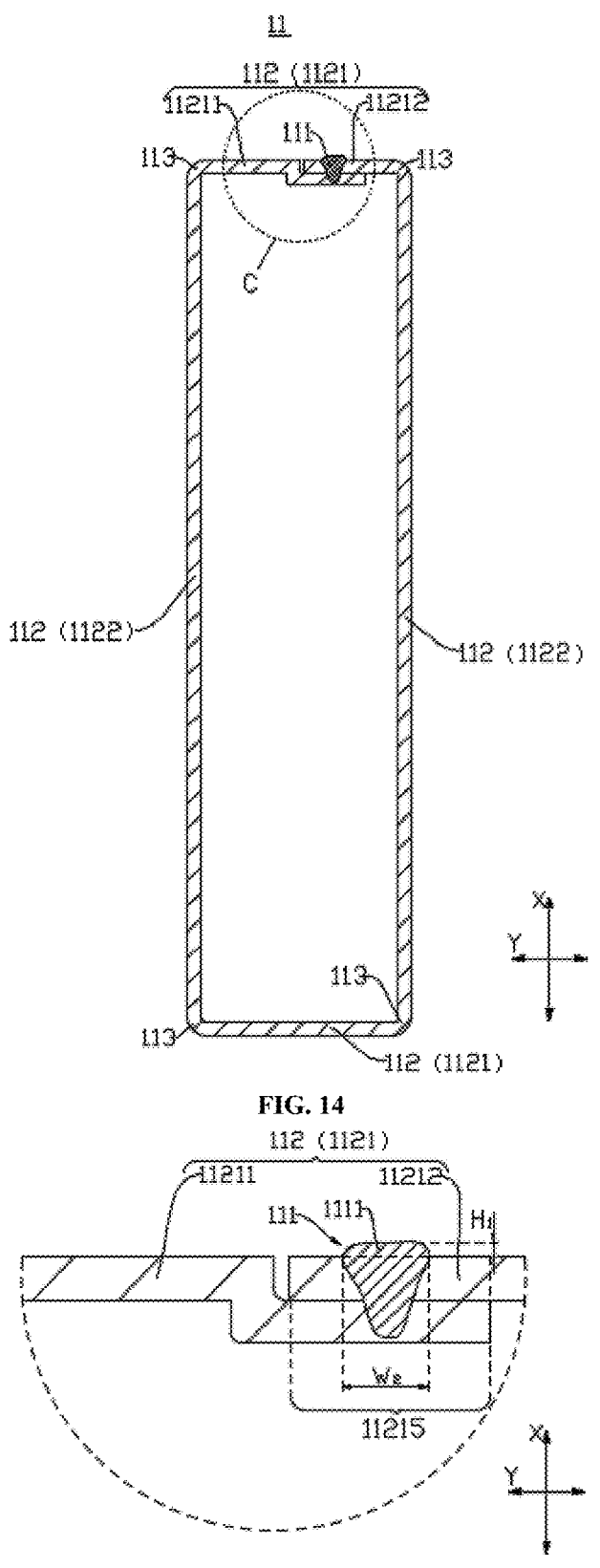
FIG. 14 is a structural schematic view of a housing provided by some other embodiments of the present disclosure.
FIG. 15 is an enlarged partial view at C in FIG. 14.

In some embodiments, referring to FIGS. 14 and 15, FIG. 14 is a structural schematic view of a housing 11 provided by some other embodiments of the present disclosure; and FIG. 15 is an enlarged partial view at C in FIG. 14. The first end portion 11211 and the second end portion 11212 have a second overlapping region 11215, and the welding mark region 111 is located in the second overlapping region 11215.

The portion where the first end portion 11211 and the second end portion 11212 overlap with each other is the second overlapping region 11215. It can be understood that part of the second overlapping region 11215 is located in the first end portion 11211, and another part of the second overlapping region 11215 is located in the second end portion 11212.

As an example, as shown in FIG. 15, in the second overlapping region 11215, the second end portion 11212 is positioned on the outer side of the first end portion 11211, and the part of the welding mark region 111 that protrudes beyond the outer surface of the second end portion 11212 is the first protruding portion 1111. In the thickness direction of the second end portion 11212, the surface of the second end portion 11212 facing away from the interior of the housing 11 is the outer surface of the second end portion 11212.

In the embodiment, the first end portion 11211 and the second end portion 11212 have a second overlapping region 11215, with the welding mark region 111 located within the second overlapping region 11215, which can reduce the welding difficulty of the first end portion 11211 and the second end portion 11212, increase the contact area between the first end portion 11211 and the second end portion 11212, and enhance the connection strength of the first end portion 11211 and the second end portion 11212.

In some embodiments, referring to FIGS. 11, 13, and 14, the housing 11 includes multiple wall portions 112 and multiple corner portions 113, and in the circumferential direction of the housing 11, each corner portion 113 connects two adjacent wall portions 112. The welding mark region 111 is located on a wall portion 112.

It can be understood that along the circumferential direction of the housing 11, the corner portion 113 and the wall portion 112 are arranged alternately, and multiple wall portions 112 and multiple corner portions 113 form an end-to-end closed structure. If the housing 11 is a triangular prism, three wall portions 112 can be provided in the housing 11, with the three wall portions 112 respectively located on the three sides of the triangle; if the housing 11 is a quadrangular prism, four wall portions 112 can be provided in the housing 11, with the four wall portions 112 respectively located on the four sides of the quadrilateral; if the housing 11 is a pentagonal prism, five wall portions 112 can be provided in the housing 11, with the five wall portions 112 respectively located on the five sides of the pentagon; and if the housing 11 is a hexagonal prism, six wall portions 112 can be provided in the housing 11, with the six wall portions 112 respectively located on the six sides of the hexagon.

The corner portion 113 is the portion connecting two adjacent wall portions 112 and is located at the corner position of the housing 11. The cross-section of the corner portion 113 can be arc-shaped, and the cross-section of the corner portion 113 is parallel to the thickness direction of the two wall portions 112 connected to the corner portion 113.

In the housing 11, if one welding position is provided for the housing 11 and one welding mark region 111 is provided on the housing 11, the welding mark region 111 is correspondingly located on one wall portion 112 of the housing 11. As shown in FIG. 11, FIG. 13, and FIG. 14, taking the housing 11 formed by bending a sheet, where the first end portion 11211 and the second end portion 11212 of the sheet are welded to form the welding mark region 111, as an example, one weld mark region 111 is provided in the housing 11.

In the housing 11, if multiple welding positions are provided for the housing 11, the number of welding mark regions 111 in the housing 11 also corresponds to the number of welding positions. Taking two welding positions for the housing 11 as an example, two welding mark regions 111 are provided in the housing 11, and the two welding mark regions 111 are respectively located on two wall portions 112 of the housing 11.

In the embodiment, the welding mark region 111 is arranged on the wall portion 112 instead of the corner portion 113, which can reduce the positioning difficulty of the housing 11 during the welding forming process, thereby reducing the forming difficulty of the housing 11, and can improve the connection strength at the welding position of the housing 11, thus enhancing the strength of the housing 11.

In some embodiments, the multiple wall portions 112 include a first wall portion 1121 and a second wall portion 1122. The first wall portion 1121 and the second wall portion 1122 are connected by a corner portion 113, wherein the second wall portion 1122 is the wall portion 112 with the largest outer surface area in the housing 11. The welding mark region 111 is located on the first wall portion 1121.

The first wall portion 1121 and the second wall portion 1122 are two adjacent wall portions 112 in the housing 11, and the two wall portions 112 are connected by one corner portion 113. In the embodiment, the shell 1 can be a triangular prism, quadrangular prism, pentagonal prism, hexagonal prism, etc. In the housing 11, the first wall portion 1121 and the second wall portion 1122 can each be one or multiple portions. For the first wall portion 1121, which is formed with a welding mark region 111, the first wall portion 1121 includes two parts that are welded together to form the welding mark region 111.

Since the second wall portion 1122 is the wall portion 112 with the largest outer surface area in the housing 11, the second wall portion 1122 is more prone to deformation compared to the first wall portion 1121 when the electrode assembly 2 inside the battery cell 10, which is located inside the housing 11, expands. By arranging the welding mark region 111 on the first wall portion 1121, which has a smaller deformation, on the one hand, the arrangement can reduce the risk of the housing 11 damage in the welding mark region 111 when the electrode assembly 2 expands; and on the other hand, it reduces the risk of the welding mark region 111 piercing through the first insulating member 3 when the electrode assembly 2 expands.

In some embodiments, referring to FIGS. 11, 13, and 14, the multiple wall portions 112 include two first wall portions 1121 and two second wall portions 1122, with the two first wall portions 1121 arranged opposite each other along a first direction X and the two second wall portions 1122 arranged opposite each other along a second direction Y, wherein the first direction X is perpendicular to the second direction Y. At least one of the first wall portions 1121 forms the welding mark region 111.

The first direction X can be the height direction of the housing 11, and the second direction Y can be the width direction of the housing 11. The height of the housing 11 is greater than the width of the housing 11, thus making the second wall portion 1122 to be the wall portion 112 with the largest outer surface area in the housing 11.

Among the two first wall portions 1121 of the housing 11, one of the first wall portions 1121 can be formed with a welding mark region 111, or both first wall portions 1121 can be formed with welding mark regions 111. As an example, one first wall portion 1121 in the housing 11 is formed with a welding mark region 111, and the first end portion 11211 and the second end portion 11212 of the sheet of the housing 11 together form the first wall portion 1121.

In the embodiment, the housing 11 is in the form of a quadrilateral prism structure, which is simple in structure. When the electrode assembly 2 inside the battery cell 10 expands, the amount of expansion of the electrode assembly 2 in the second direction Y is greater than the amount of expansion in the first direction X, causing the amount of deformation of the two second wall portions 1122, which are compressed by the electrode assembly 2, to be greater than the deformation of the two first wall portions 1121. Therefore, arranging the welding mark region 111 on the first wall portion 1121 can reduce the impact of the expansion of the electrode assembly 2 on the welding mark region 111, increase the structural strength of the housing 11, and reduce the risk of the welding mark region 111 piercing the first insulating member 3.

Figure 16:
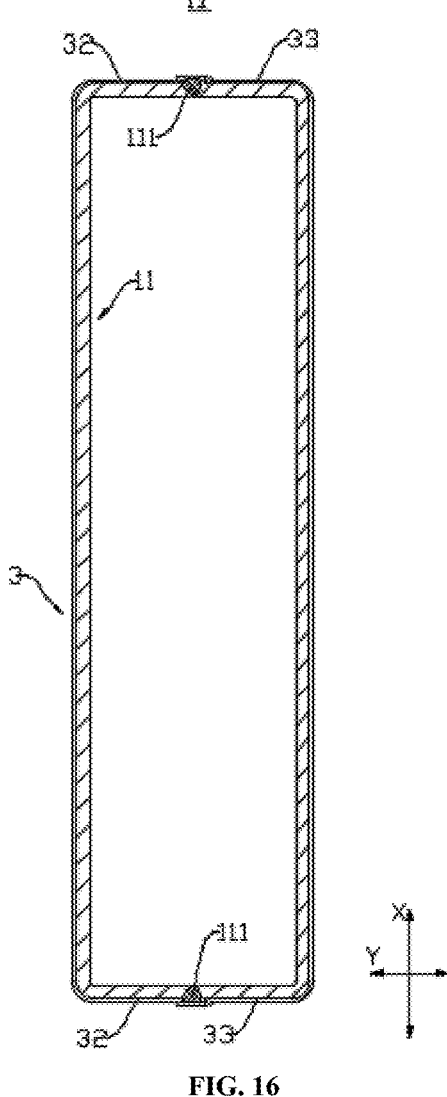
FIG. 16 is an assembly view of a housing and a first insulating member provided by other embodiments of the present disclosure.
Figures 17, 18:
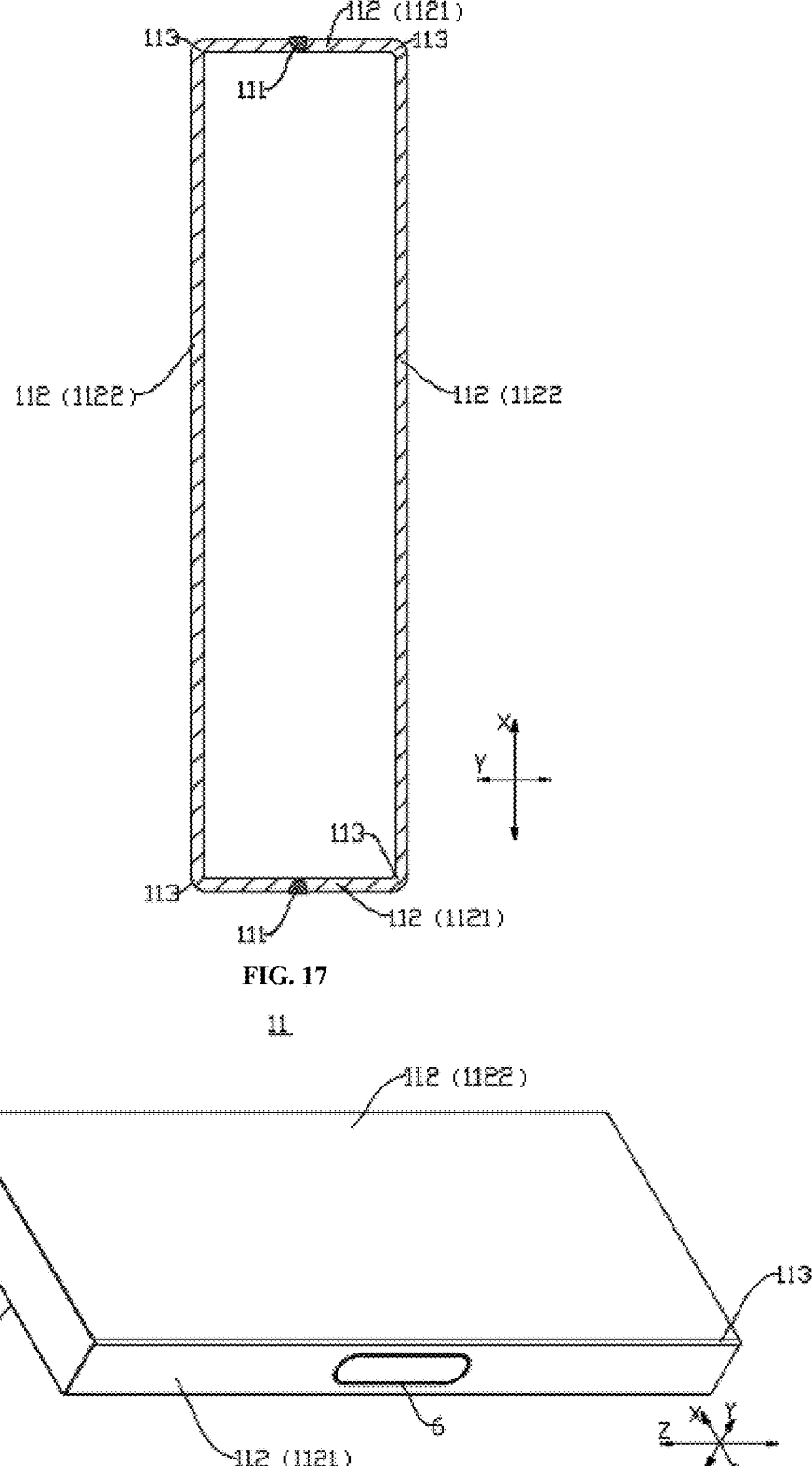
FIG. 17 is a structural schematic view of a housing shown in FIG. 16.
FIG. 18 is an isometric view of a housing provided by some embodiments of the present disclosure.

As shown from the above embodiment, in the housing 11, it is possible for only one first wall portion 1121 to be formed with a welding mark region 111. In other embodiments, referring to FIG. 16 and FIG. 17, where FIG. 16 is an assembly view of a housing 11 and a first insulating member 3 in another embodiment of the present disclosure, and FIG. 17 is a schematic structural view of a housing 11 shown in FIG. 16. It is also possible for both first wall portions 1121 in the housing 11 to be formed with welding mark regions 111.

It can be understood that two welding mark regions 111 are provided in the housing 11, with the two welding mark regions 111 respectively located on the two first wall portions 1121. In an embodiment where the first insulating member 3 includes a first insulating portion 32 and a second insulating portion 33, and the first overlapping region between the first insulating portion 32 and the second insulating portion 33 forms a first thickened region 31, the first insulating member 3 can include two sheet bodies. The two sheet bodies are arranged on the outer surface of the housing 11, wherein both end portions of one sheet body are the first insulating portion 32, and both end portions of the other sheet body are the second insulating portion 33. A first insulating portion 32 of one sheet body and a second insulating portion 33 of the other sheet body have a first overlapping region, wherein the first overlapping region covers a welding mark region 111 on one first wall portion 1121. Another first insulating portion 32 of one sheet body and another second insulating portion 33 of the other sheet body have another first overlapping region, wherein the first overlapping region covers a welding mark region 111 on the other first wall portion 1121.

Referring to FIG. 18, FIG. 18 is an isometric view of a housing 11 provided by some embodiments of the present disclosure. In some embodiments, the battery cell 10 further includes a pressure relief mechanism 6, with the pressure relief mechanism 6 and the welding mark region 111 located on separate wall portions 112.

The pressure relief mechanism 6 is a component configured for releasing the internal pressure of the battery cell 10. When the internal pressure of the battery cell 10 reaches a threshold value, the internal pressure of the battery cell 10 is released through the pressure relief mechanism 6.

The wall portion 112 where the pressure relief mechanism 6 is located and the wall portion 112 where the welding mark region 111 is located can be two adjacent wall portions 112, or they can be connected through other wall portions 112.

The pressure relief mechanism 6 and the housing 11 can be of an integrated structure. For instance, a nick groove is arranged on the wall portion 112 of the housing 11, and the region of the wall portion 112 where the nick groove is arranged corresponds to the formation of the pressure relief mechanism 6. The nick groove can be of various shapes, such as a straight groove, circular groove, elliptical groove, annular groove, arc groove, U-shaped groove, and H-shaped groove, wherein a circular groove refers to a groove with a circular cross-section, and an elliptical groove refers to a groove with an elliptical cross-section. The cross-section herein is perpendicular to the thickness direction of the wall portion 112 on which the nick groove is arranged. As an example, in FIG. 18, the nick groove is an annular groove.

The pressure relief mechanism 6 and the housing 11 can also be of a split structure. The pressure relief mechanism 6 and the housing 11 are two separate components, which are formed separately and then mounted together. The pressure relief mechanism 6 can be a component such as a rupture valve or rupture disk. The pressure relief mechanism 6 can be mounted on the wall portion 112 of the housing 11 through bonding, welding, and other methods.

In the embodiment, the pressure relief mechanism 6 and the welding mark region 111 are located on separate wall portions 112. By not arranging the pressure relief mechanism 6 and the welding mark region 111 on the same wall portion 112, the impact on the pressure relief mechanism 6, when the housing 11 is welded to form the welding mark region 111, is reduced, thereby improving the reliability of the pressure relief mechanism 6.

In some embodiments, referring to FIG. 18, the multiple wall portions 112 include two opposing first wall portions 1121, with the pressure relief mechanism 6 and the welding mark region 111 respectively located on the two first wall portions 1121.

The two first wall portions 1121 are two opposite wall portions 112 in the housing 11.

As an example, the multiple wall portions further include two opposite second wall portions 1122, and the first wall portion 1121 and the second wall portion 1122 are connected through a corner portion. The two first wall portions 1121 are arranged oppositely along the first direction X, and the two second wall portions 1122 are arranged oppositely along the second direction Y, with the first wall portion 1121 perpendicular to the second wall portion 1122. Along the first direction X, the spacing between the two first wall portions 1121 is greater than the spacing between the two second wall portions 1122.

In the embodiment, the pressure relief mechanism 6 and the welding mark region 111 are located on separate first wall portions 1121. Thus, the distance between the pressure relief mechanism 6 and the welding mark region 111 in the circumferential direction of the housing 11 is increased, further reducing the impact on the pressure relief mechanism 6 when the housing 11 is welded to form the welding mark region 111.

Figure 19:
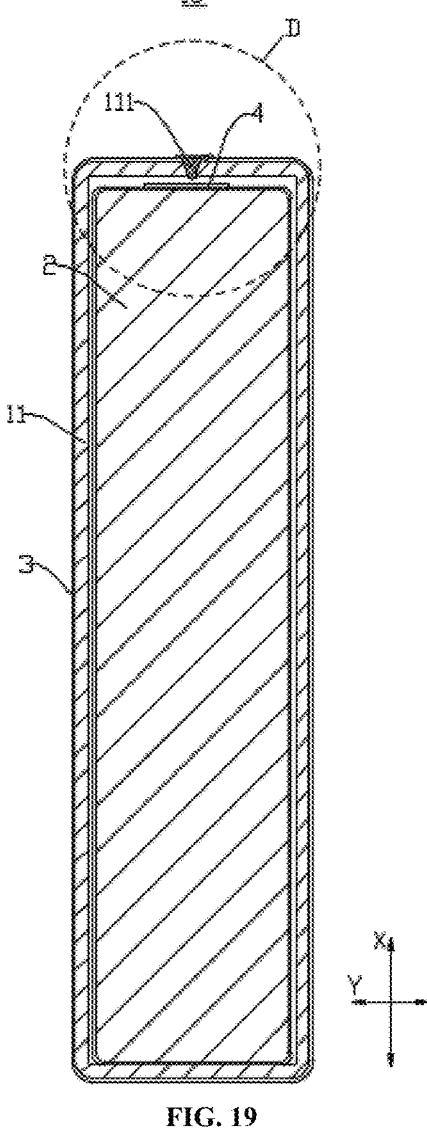
FIG. 19 is a structural schematic view of a battery cell provided by some embodiments of the present disclosure.
Figure 20:
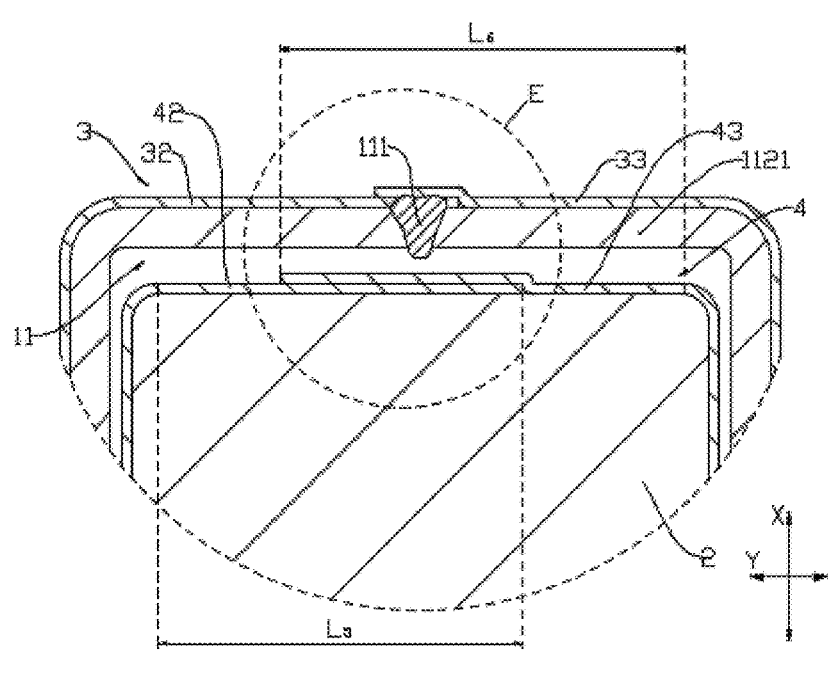
FIG. 20 is an enlarged partial view at D in FIG. 19.
Figure 21:
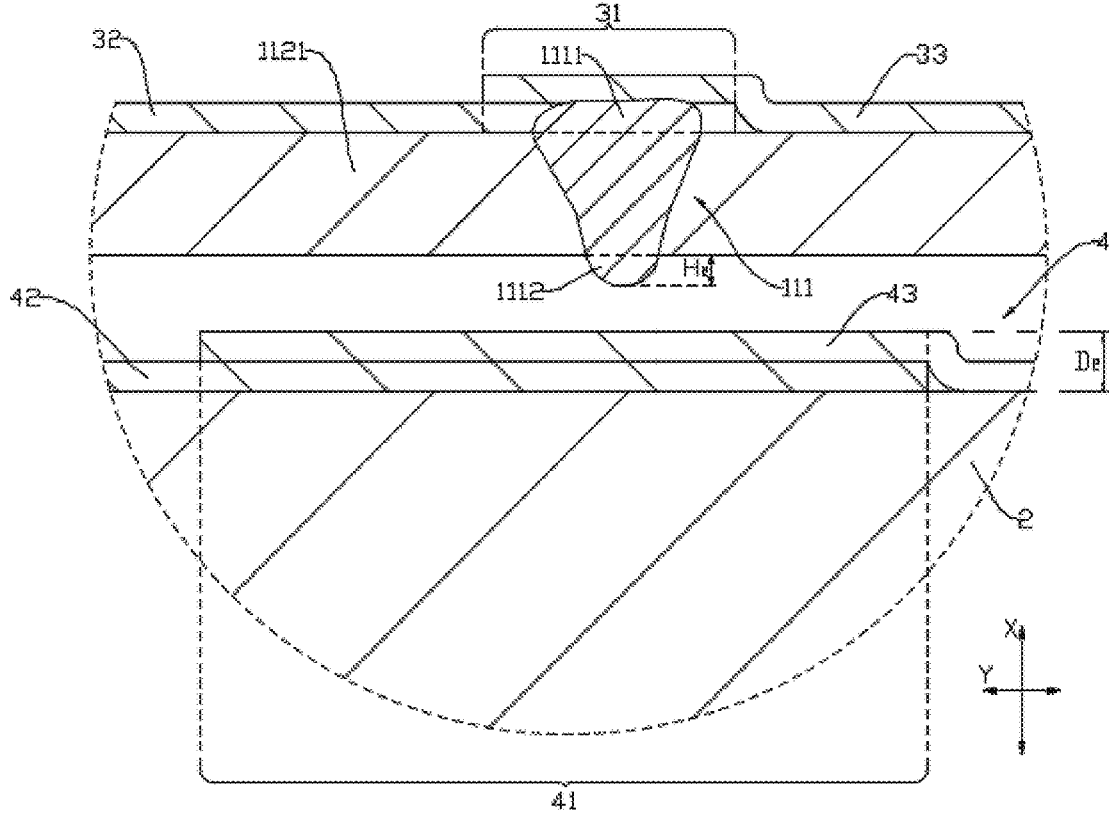
FIG. 21 is an enlarged partial view at E in FIG. 20.

In some embodiments, referring to FIGS. 19 to 21, FIG. 19 is a structural schematic view of a battery cell 10 provided by some embodiments of the present disclosure; FIG. 20 is an enlarged partial view at D in FIG. 19; and FIG. 21 is an enlarged partial view at E in FIG. 20. The battery cell 10 further includes an electrode assembly 2 and a second insulating member 4. The electrode assembly 2 is arranged inside the housing 11. The second insulating member 4 is arranged between the electrode assembly 2 and the housing 11, and the second insulating member 4 is configured to insulate and isolate the electrode assembly 2 from the housing 11.

The second insulating member 4 includes a second thickened region 41, and the second thickened region 41 covers at least a portion of the welding mark region 111.

The second insulating member 4 is an insulating component arranged between the electrode assembly 2 and the housing 11. It is made of an insulating material, such as rubber or plastic.

The second insulating member 4 can be an integrally molded insulating sleeve structure; and the second insulating member 4 can also be formed by a sheet body that surrounds the electrode assembly 2. The second insulating member 4 can be formed by connecting the first and last two ends of a sheet body to each other; the second insulating member 4 can also be formed by multiple sheet bodies, with the multiple sheet bodies arranged separately, and the adjacent two sheet bodies connected to each other.

The second thickened region 41 is a locally thickened region on the second insulating member 4. It can be a protrusion formed on the second insulating member 4 to form the second thickened region 41; or the two parts of the second insulating member 4 can overlap with each other, making the overlapping region thicker to form the second thickened region 41.

The second thickened region 41 can correspond one-to-one with the welding mark region 111, or one first thickened region 31 can correspond to multiple welding mark regions 111. The second thickened region 41 covers at least a portion of the welding mark region 111, meaning that the projection of the welding mark region 111 along the thickness direction of the housing 11 is at least partially located within the second thickened region 41. The second thickened region 41 can completely cover the welding mark region 111, meaning that the projection of the welding mark region 111 along the thickness direction of the housing 11 is entirely located within the second thickened region 41. The second thickened region 41 can also cover a portion of the welding mark region 111, meaning that part of the projection of the welding mark region 111 along the thickness direction of the housing 11 is located within the second thickened region 41. The second thickened region 41 and the welding mark region 111 can be in contact or can be arranged with a gap. As an example, in FIG. 21, the second thickened region 41 and the welding mark region 111 are arranged with a gap, thus making it more difficult for the welding mark region 111 to pierce the second insulating member 4. Taking the housing 11, which has two opposing first wall portions 1121, as an example, one first wall portion 1121 is located at the bottom of the electrode assembly 2 to support the electrode assembly 2, and the other wall portion 112 is located at the top of the electrode assembly 2 and is formed with the welding mark region 111. In this way, under the influence of the weight of the electrode assembly 2, the second thickened region 41 of the second insulating member 4 and the welding mark region 111 are arranged with a gap.

The second insulating member 4 is located between the electrode assembly 2 and the housing 11, serving to separate the electrode assembly 2 from the housing 11 and thereby providing insulation between the electrode assembly 2 and the housing 11. The second thickened region 41 of the second insulating member 4 covers at least a portion of the welding mark region 111, which reduces the risk of failure of the insulation between the electrode assembly 2 and the housing 111 due to penetration of the second insulating member 2 by the welding mark region 111.

In some embodiments, referring to FIGS. 20 and 21, the second insulating member 4 includes a third insulating portion 42 and a fourth insulating portion 43, wherein the third insulating portion 42 and fourth insulating portion 43 have a third overlapping region, and the third overlapping region forms the second thickened region 41.

The second insulating member 4 can be formed by a single sheet body that surrounds the housing 11, with the third insulating portion 42 and the fourth insulating portion 43 are two portions integrally formed in the second insulating member 4. The third insulating portion 42 and the fourth insulating portion 43 can also be arranged separately and connected, for example, the second insulating member 4 can be formed by multiple sheet bodies arranged separately, with the multiple sheet bodies surrounding the housing 11. Adjacent two sheet bodies are connected to each other, and in the adjacent two sheet bodies, one sheet body forms all or a portion of the third insulating portion 42, and the other sheet body forms all or a portion of the fourth insulating portion 43, with the third insulating portion 42 and the fourth insulating portion 43 forming the third overlapping region. Of course, two, three, four, or more sheet bodies in the second insulating member 4 can be provided.

The portion where the third insulating portion 42 and the fourth insulating portion 43 overlap with each other is the second thickened region 41. It can be understood that part of the second thickened region 41 is located in the third insulating portion 42, and another part of the second thickened region 41 is located in the fourth insulating portion 43. In the second thickened region 41, the third insulating portion 42 and the fourth insulating portion 43 can be connected in various ways, such as by adhesion and hot-melt connection. The thickness of the third insulating portion 42 and the thickness of the fourth insulating portion 43 can be equal, or they can be different.

Through the overlapping of the third insulating portion 42 and the fourth insulating portion 43 to form the third overlapping region, local thickening of the second insulating member 4 is achieved, thereby correspondingly forming the second thickened region 41, with a simple formation method for the second thickened region 41. It can be understood that the second insulating member 4 has two layers of insulating portions in the third overlapping region, and the region is a double-layer structure. For example, in the third overlapping region, the third insulating portion 42 is located on the side of the fourth insulating portion 43 facing the electrode assembly 2. Even if the welding mark region 111 pierces the fourth insulating portion 43, it is not easy to pierce the third insulating portion 42. The third insulating portion 42 can still provide good insulation protection, thereby reducing the risk of the welding mark region 111 piercing the second insulating member 4.

In some embodiments, referring to FIGS. 19 to 21, the second insulating member 4 is covered on the outer surface of the electrode assembly 2 in a circumferential direction of the housing 11, and in the circumferential direction of the housing 11, two end portions of the second insulating member 4 respectively form the third insulating portion 42 and the fourth insulating portion 43.

The circumferential direction of the housing 11 coincides with the circumferential direction of the electrode assembly 2.

In the embodiment, the second insulating member 4 can be formed by a single sheet body that surrounds the housing 11 along the circumferential direction of the housing 11. The third insulating portion 42 and the fourth insulating portion 43 are the two end portions of the second insulating member 4, and it can be understood that the two end portions of the second insulating member 4 form the third overlapping region. The portion of the second insulating member 4 that extends positively from an end surface of one end along the circumferential direction of the housing 11 within a region of the fifth preset distance $L_5$ is an end portion of the second insulating member 4, wherein a length of the portion is equal to the fifth preset distance $L_5$. The portion of the second insulating member 4 that extends reversely from an end surface of another end along the circumferential direction of the housing 11 within a region of the sixth preset distance $L_6$ is another end portion of the second insulating member 4, wherein a length of the portion is equal to the sixth preset distance $L_6$. The first preset distance $L_5$ and the second preset distance Le can be equal or not equal. As an example, the welding mark region 111 is located on the first wall portion 1121 of the housing 11. The third insulating portion 42 and the fourth insulating portion 43 are arranged opposite to the first wall portion 1121, and gaps are formed between both the third wall portion 112 and the fourth wall portion 112 and the first wall portion 1121.

In the embodiment, by covering the second insulating member 4 on the outer surface of the electrode assembly 2 in a circumferential direction of the housing 11, more regions of the outer surface of the electrode assembly 2 can be rapidly covered, thereby improving the insulation between the electrode assembly 2 and the housing 11. When the second insulating member 4 is covered on the outer surface of the electrode assembly 2 in the circumferential direction of the housing 11 and the two end portions of the second insulating member 4 overlap, the second thickened region 41 can be formed, with a simple method for forming the second thickened region 41.

In some embodiments, referring to FIG. 21, the second thickened region 41 completely covers the welding mark region 111.

It can be understood that the projection of the welding mark region 111 along the thickness direction of the housing 11 is entirely within the second thickened region 41.

In the embodiment, the second thickened region 41 completely covers the second protruding portion 111. Increasing the overlap region between the second thickened region 41 and the welding mark region 111 further reduces the risk of the welding mark region 111 piercing through the second insulating member 4.

In some embodiments, referring to FIG. 21, the welding mark region 111 includes a second protruding portion 1112 that protrudes from the inner surface of the housing 11, wherein a height of the second protruding portion 1112 protruding from the inner surface of the housing 11 is $H_2$, and a thickness of the second thickened region 41 is $D_2$, wherein $H_2 < D_2$.

The second protruding portion 1111 is the part of the welding mark region 111 that protrudes from the inner surface of the housing 11. The second protruding portion 1112 can be formed by solder or welding slag during the welding process of the housing 11, or the second protruding portion 1112 can be the part that protrudes from the outer surface of the housing 11 after the welding part has fused.

The height direction of the second protruding portion 1112 and the thickness direction of the second thickened region 41 are both consistent with the thickness direction of the first wall portion 1121. Taking the third insulating portion 42 and the fourth insulating portion 43 of the second insulating member 4 forming the third overlapping region, corresponding to the formation of the second thickened region 41 as an example, the total thickness of the third insulating portion 42 and the fourth insulating portion 43 is the thickness $D_2$ of the second thickened region 41.

In the present embodiment, $H_2 < D_2$, so even if the second protruding portion 1112 fully penetrates the second thickened region 41, it is unlikely to pierce through the second thickened region 41, thus further reducing the risk of insulation failure between the electrode assembly 2 and the housing 11.

Figure 22:
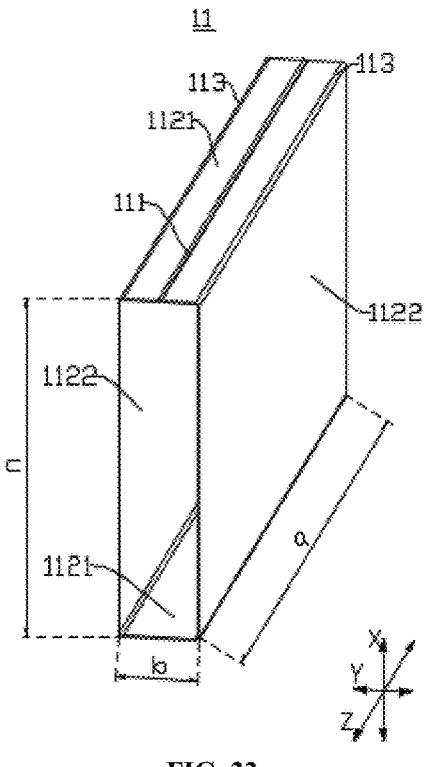
FIG. 22 is an isometric view of a housing provided by other embodiments of the present disclosure.

In some embodiments, referring to FIG. 22, FIG. 22 is an isometric view of a housing 11 provided by some embodiments of the present disclosure. The housing 11 is a rectangular prism housing. The housing 11 is suitable for rectangular battery cells 10, thereby meeting the requirements for large-capacity battery cells 10.

In some embodiments, openings are formed at opposite ends of the housing 11 along a length direction of the housing 11. A length of the housing 11 is a, a width of the housing 11 is b, and a height of the housing 11 is c, satisfying a condition of b≤c≤a/1.5.

It can be understood that in the condition of a/c≥1.5, a/c can be any point value such as 1.5, 2, 3, 4, 5, or any range value between any two of these. It can be b<c or b=c. In the embodiment shown in FIG. 22, b<c.

As an example, the housing 11 includes two first wall portions 1121 and two second wall portions 1122. The first wall portions 1121 and the second wall portions 1122 are connected by a corner portion 113. The two first wall portions 1121 are oppositely arranged along the first direction X, and the welding mark region 111 is formed on one of the two first wall portions 1121. The two second wall portions 1122 are oppositely arranged along the second direction Y. The two openings of the housing 11 are oppositely arranged along the third direction Z. The first direction X, the second direction Y, and the third direction Z are perpendicular to each other. The first direction X can be the height direction of housing 11, the second direction Y can be the width direction of housing 11, and the third direction Z can be the length direction of housing 11.

The elongated shape of the housing 11 is beneficial for increasing the energy density of battery cell 10. In embodiments where the housing 11 is formed by bending a sheet, with the two end portions of the sheet welded to form the welding mark region 111, the housing 11 formed by bending a sheet is easier to form compared to the housing 11 formed by traditional stamping or drawing, with higher forming efficiency and product yield, especially for thin-wall housing 11 with a wall thickness not greater than 0.6 mm.

In some embodiments, referring to FIG. 4, openings are formed at opposite ends of the housing 11. The battery cell 10 further includes end covers 12, each of the end covers 12 corresponding to an opening, with the end covers 12 sealing the openings.

The two openings are oppositely arranged along the third direction Z, and the circumference of the housing 11 is arranged around a central line, with the central line extending along the third direction Z.

Exemplarily, the electrode terminals 5 are provided on the end cover 12. In the battery cell 10, one end cover 12 is provided with a positive electrode terminal, and the other end cover 12 is provided with a negative electrode terminal. The electrode assembly 2 has a positive electrode tab and a negative electrode tab, with the positive electrode tab and the negative electrode tab formed at opposite ends of the electrode assembly 2 along the third direction Z. The positive electrode tab is electrically connected to the positive electrode terminal, and the negative electrode tab is electrically connected to the negative electrode terminal.

During the assembly of the battery cell 10, the electrode assembly 2 can enter the housing 11 through the opening at either end of the housing 11, thus effectively enhancing the assembly efficiency of the battery cell 10.

The embodiments of the present disclosure provide a battery 100, comprising any of the battery cells 10 provided in the above embodiments.

The embodiments of the present disclosure further provide electrical equipment, which includes battery cell 10 provided by any of the embodiments as described above. The battery cell 10 is configured to supply electric energy.

The present disclosure provides an embodiment of a battery cell 10, including a housing 11, an end cover 12, an electrode assembly 2, a first insulating member 3, and a second insulating member 4. The housing 11 is a rectangular prism housing. The housing 11 includes two first wall portions 1121 and two second wall portions 1122. The first wall portions 1121 and the second wall portions 1122 are connected through the corner portions 113. The two first wall portions 1121 are oppositely arranged along the first direction X, and the two second wall portions 1122 are oppositely arranged along the second direction Y. The second wall portions 1122 are the wall portions 112 with the largest outer surface area in the housing 11. The housing 11 is provided two openings, wherein the two openings are oppositely arranged along the third direction Z. The first direction X, the second direction Y, and the third direction Z are mutually perpendicular. The housing 11 is formed by bending a sheet, and in the circumferential direction of the housing 11, the sheet includes a first end portion 11211 and a second end portion 11212, wherein the first end portion 11211 and the second end portion 11212 are welded together to form the welding mark region 111. The welding mark region 111 includes the first protruding portion which protrudes from the outer surface of the housing 11 and the second protruding portion 1112 which protrudes from the inner surface of the housing 11. Two end covers 12 are provided, and the two end covers 12 seal the two openings of the housing 11 respectively. One end cover 12 is provided with a positive electrode terminal, and the other end cover 12 is provided with a negative electrode terminal. The electrode assembly 2 is provided inside the housing 11. The positive electrode tab and the negative electrode tab are formed at the two ends of the electrode assembly 2 along the third direction Z. The positive electrode tab is electrically connected to the positive electrode terminal, and the negative electrode tab is electrically connected to the negative electrode terminal. The first insulating member 3 is covered on the outer surface of the housing 11 in the circumferential direction of the housing 11. Along the circumferential direction of the housing 11, the two end portions of the first insulating member 3 have a first overlapping region, and the first overlapping region forms a first thickened region 31 of the first insulating member 3. The first thickened region 31 completely covers the welding mark region 111. In the circumferential direction of the housing 11, a width of the first thickened region 31 is $W_1$, satisfying a condition of $W_1 \geq 3$ mm; and a width of the first protruding portion 1111 is $W_2$, satisfying a condition of $W_1 - W_2 \geq 1$ mm. A height of the first protruding portion 1111 protruding from the outer surface of the housing 11 is $H_1$, and a thickness of the first thickened region 31 is $D_1$, satisfying a condition of $H_1 < D_1$. The second insulating member 4 is covered on the outer surface of the electrode assembly 2 in the circumferential direction of the housing 11. Along the circumferential direction of the housing 11, the two end portions of the second insulating member 4 have a second overlapping region, and the second overlapping region forms a second thickened region 41 of the second insulating member 4. The second thickened region 41 completely covers the welding mark region 111. A height of the second protruding portion 1112 protruding from the inner surface of the housing 11 is $H_2$, and a thickness of the second thickened region 41 is $D_2$, satisfying a condition of $H_2 < D_2$.

It should be noted that the embodiments and features described in the present disclosure can be combined with each other without conflict.

The above embodiments are provided only to illustrate the technical solutions of the present disclosure and are not intended to limit the scope of the present disclosure. For those skilled in the art, various modifications and changes can be made to the present disclosure. Any modification, equivalent substitution, improvement, etc. made within the spirit and principles of the present disclosure shall be included in the scope of protection of the present disclosure.

What we claim is:

1. A battery cell, comprising
a housing providing a welding mark region; and
a first member arranged on an outer surface of the housing, wherein the first insulator provides a first thickened region, and the first thickened region covers at least a portion of the welding mark region,
wherein openings are formed at opposite ends of the housing;
the battery cell further comprises end covers, each of the end covers corresponding to an opening, with the end covers sealing the openings;
the housing comprises multiple wall portions and multiple corner portions, and in the circumferential direction of the housing, each corner portion connects two adjacent wall portions;
the welding mark region is located on the wall portion; and
the welding mark region is located on a center region of the wall portion, covering a full straight line between the opposite ends of the housing, between two adjacent corner portions in the circumferential direction of the wall portion.

2. The battery cell according to claim 1, wherein the first thickened region completely covers the welding mark region.

3. The battery cell according to claim 1, wherein in the circumferential direction of the housing, a width of the first thickened region is $W_1$, and a width of the welding mark region is $W_2$, satisfying a condition of $W_1 > W_2$.

4. The battery cell according to claim 3, wherein $W_1 - W_2 \geq 1$ mm.

5. The battery cell according to claim 3, wherein $W_1 \geq 3$ mm.

6. The battery cell according to claim 1, wherein welding mark region comprises a first protruding portion protruding from the outer surface of the housing, a height of the first protruding portion protruding from the outer surface of the housing is $H_1$, and a thickness of the first thickened region is $D_1$, satisfying a condition of $H_1 < D_1$.

7. The battery cell according to claim 1, wherein the housing is formed by bending a sheet, in the circumferential direction of the housing, the sheet comprises a first end portion and a second end portion, and the first end portion and the second end portion are welded together to form the welding mark region.

8. The battery cell according to claim 7, wherein an end surface of the first end portion is welded to an end surface of the second end portion.

9. The battery cell according to claim 7, wherein the first end portion and the second end portion provide a second overlapping region, and the welding mark region is located in the second overlapping region.

10. The battery cell according to claim 1, wherein the battery cell further comprises
an electrode assembly arranged inside the housing; and
a second insulator arranged between the electrode assembly and the housing, wherein the second insulator is configured to insulate and isolate the electrode assembly from the housing; and
the second insulator provides a second thickened region, and the second thickened region covers at least a portion of the welding mark region.

11. A battery, comprising the battery cell according to claim 1.

12. An electrical equipment, comprising the battery cell according to claim 1, wherein the battery cell is configured to provide electrical energy.

13. The battery cell according to claim 1, wherein the first insulator comprises a first insulating portion and a second insulating portion, the first insulating portion and the second insulating portion are arranged on the outer surface of the housing, the first insulating portion and the second insulating portion provide a first overlapping region, and the first overlapping region forms the first thickened region.

14. The battery cell according to claim 13, wherein the first insulator is covered on the outer surface of the housing in a circumferential direction of the housing, and in the circumferential direction of the housing, two end portions of the first insulator respectively form the first insulating portion and the second insulating portion.

15. The battery cell according to claim 13, wherein the housing comprises a first wall portion, the welding mark region is located on the first wall portion, and the first insulating portion and the second insulating portion jointly cover an outer surface of the first wall portion.

16. The battery cell according to claim 1, wherein the multiple wall portions comprise a first wall portion and a second wall portion, the first wall portion and the second wall portion are connected by one corner portion, the second wall portion is a wall portion with a largest outer surface area in the housing, and the welding mark region is located on the first wall portion.

17. The battery cell according to claim 16, wherein the multiple wall portions comprise two first wall portions and two second wall portions, with the two first wall portions arranged opposite each other along a first direction and the two second wall portions arranged opposite each other along a second direction, and the first direction is perpendicular to the second direction; and
at least one of the first wall portions forms the welding mark region.

18. The battery cell according to claim 1, wherein the battery cell further comprises a pressure relief structure, with the pressure relief structure and the welding mark region located on separate wall portions.

19. The battery cell according to claim 18, wherein the multiple wall portions comprise two opposing first wall portions, with the pressure relief structure and the welding mark region respectively located on the two first wall portions.

* * * * *